US012545693B2

(12) United States Patent
Yang et al.

(10) Patent No.: US 12,545,693 B2
(45) Date of Patent: Feb. 10, 2026

(54) METHOD OF STORING HIGH PURITY ALKYL TIN COMPOUNDS

(71) Applicants: Gelest, Inc., Morrisville, PA (US); Mitsubishi Chemical Corporation, Tokyo (JP)

(72) Inventors: Li Yang, Belle Mead, NJ (US); Yuta Hioki, Tokyo (JP)

(73) Assignees: GELEST, INC., Morrisville, PA (US); MITSUBISHI CHEMICAL CORPORATION., Tokyo (JP)

( * ) Notice: Subject to any disclaimer, the term of this patent is extended or adjusted under 35 U.S.C. 154(b) by 0 days.

(21) Appl. No.: 18/389,294

(22) Filed: Nov. 14, 2023

(65) Prior Publication Data

US 2024/0092811 A1 Mar. 21, 2024

Related U.S. Application Data

(62) Division of application No. 18/205,009, filed on Jun. 2, 2023.

(60) Provisional application No. 63/348,173, filed on Jun. 2, 2022.

(51) Int. Cl.
C07F 7/22 (2006.01)
(52) U.S. Cl.
CPC .......... C07F 7/2284 (2013.01); C07F 7/2296 (2013.01)
(58) Field of Classification Search
None
See application file for complete search history.

(56) References Cited

U.S. PATENT DOCUMENTS

| | | | |
|---|---|---|---|
| 2,592,926 A | 4/1952 | Mack et al. |
| 2,602,651 A | 7/1952 | Cannon |
| 3,417,116 A | 12/1968 | Considine et al. |
| 3,470,220 A | 9/1969 | Moedritzer et al. |
| 3,519,666 A | 7/1970 | Pellegrini et al. |
| 3,590,060 A | 6/1971 | Murch |
| 3,976,672 A | 8/1976 | Strunk et al. |
| 4,370,028 A | 1/1983 | Bernhardt |
| 4,556,725 A | 12/1985 | Kanner et al. |
| 4,696,837 A | 9/1987 | Lindner |
| 5,075,468 A | 12/1991 | Frances et al. |
| 5,123,998 A | 6/1992 | Kishimura |
| 5,274,149 A | 12/1993 | Calbick et al. |
| 5,698,262 A | 12/1997 | Soubeyrand et al. |
| 6,022,822 A | 2/2000 | Noyori |
| 6,100,415 A | 8/2000 | Takamatsu et al. |
| 6,162,756 A | 12/2000 | Friebe et al. |
| 6,271,329 B1 | 8/2001 | Kristen et al. |
| 6,861,544 B1 | 3/2005 | Curran et al. |
| 6,984,591 B1 | 1/2006 | Buchanan et al. |
| 7,045,451 B2 | 5/2006 | Shenai-Khatkhate |
| 7,384,872 B2 | 6/2008 | Hwang et al. |
| 7,413,776 B2 | 8/2008 | Shenai-Khatkhate et al. |
| 7,683,004 B2 | 3/2010 | Feldman et al. |
| 7,745,102 B2 | 6/2010 | Fedynyshyn et al. |
| 7,767,840 B2 | 8/2010 | Shenai-Khatkhate et al. |
| 7,919,423 B2 | 4/2011 | Feldman et al. |
| 8,008,518 B2 | 8/2011 | Shinohata et al. |
| 8,415,000 B2 | 4/2013 | Stowers et al. |
| 8,454,928 B2 | 6/2013 | Dussarrat |
| 8,563,231 B2 | 10/2013 | Wang et al. |
| 8,901,335 B2 | 12/2014 | Modtland et al. |
| 9,085,594 B2 | 7/2015 | Modtland et al. |
| 9,310,684 B2 | 4/2016 | Meyers et al. |
| 10,732,505 B1 | 8/2020 | Meyers et al. |
| 10,787,466 B2 | 9/2020 | Edson et al. |

(Continued)

FOREIGN PATENT DOCUMENTS

| | | |
|---|---|---|
| CA | 3080934 A1 | 10/2019 |
| CN | 102212079 A | 10/2011 |

(Continued)

OTHER PUBLICATIONS

J. Mayo, "5 Reasons your Process Could Benefit from Glass-Lined Steel Equipment", 1-7 (2013) (Year: 2013).*
B. Furniss et al., Vogel's Textbook of Practical Organic Chemistry 169-190 (1989) (Year: 1989).*
Wilkins, Metano Tote Talk Blog (2017) (Year: 2017).*
Declaration of Dr. Drew Hood in IRP2025-00267 (*Entegris, Inc.* v. *Inpria Corp*, U.S. Pat. No. 11,673,903) (Dec. 10, 2024) (Year: 2024).*
Abel et al., "The Synthesis and Characterization of Some (Aminomethyl)Trialkyl- and (Aminomethyl)Triphenyl-Tins," Journal of Organometallic Chemistry, vol. 97, pp. 159-165 (1975).
Armarego, W.L.F., "Purification of Laboratory Chemicals," 6th Edition, Elsevier Inc., pp. xii-743 (2009).
Barreca et al., "MOCVD of SnO2 thin films from a new organometallic precursor," J. Phys. IV France, vol. 9, pp. Pr8-667-Pr8-673 (1999).
Brown et al., "Organoboranes for synthesis. 9. Rapid reaction of organoboranes with iodine under the influence of base. A convenient procedure for the conversion of alkenes into iodides via hydroboration," Tetrahedron, vol. 44, No. 10, pp. 2751-2762 (1988).

(Continued)

*Primary Examiner* — Alexander R Pagano
(74) *Attorney, Agent, or Firm* — Panitch Schwarze Belisario & Nadel LLP

(57) ABSTRACT

Monoalkyl tin triamide compounds having purity of at least about 99 mol % and the chemical formula $RSn(NMe_2)_3$ are described. $R^1$ is selected from $R^A$, $R^B$, and $R^C$; $R^A$ is a primary alkyl group having about 1 to 10 carbon atoms, $R^B$ is a secondary alkyl group having about 3 to 10 carbon atoms, and $R^C$ is a tertiary alkyl group having about 3 to 10 carbon atoms; each $R^2$ is independently an alkyl group having about 1 to 10 carbon atoms; and a content of $R^1Sn(NR^2_2)_2(N(R^2)CH_2NR^2_2)$ is less than about 1 mol %. Methods for synthesizing, purifying, and storing these compounds are also provided. The monoalkyl tin compounds may be used for the formation of high-resolution EUV lithography patterning precursors and are attractive due to their high purity and minimal concentration of dialkyl tin and other tin impurities.

10 Claims, 6 Drawing Sheets

(56) References Cited

U.S. PATENT DOCUMENTS

| | | |
|---|---|---|
| 10,862,199 B1 | 12/2020 | Zhang et al. |
| 11,079,676 B2 | 8/2021 | Asano et al. |
| 11,156,915 B2 | 10/2021 | Tsubaki et al. |
| 11,300,876 B2 | 4/2022 | Jiang et al. |
| 11,459,656 B1 | 10/2022 | Arkles et al. |
| 11,500,284 B2 | 11/2022 | Meyers et al. |
| 11,697,660 B2 | 7/2023 | Kuiper et al. |
| 12,060,377 B2 * | 8/2024 | Yang .................. C09D 7/63 |
| 2001/0001796 A1 | 5/2001 | Lynch et al. |
| 2003/0015249 A1 | 1/2003 | Jursich |
| 2004/0077892 A1 | 4/2004 | Arkles et al. |
| 2004/0202956 A1 | 10/2004 | Takahashi et al. |
| 2009/0155546 A1 | 6/2009 | Yamashita et al. |
| 2010/0270296 A1 | 10/2010 | Rauleder et al. |
| 2011/0070371 A1 | 3/2011 | Gessert et al. |
| 2011/0166268 A1 | 7/2011 | Deelman et al. |
| 2011/0171382 A1 | 7/2011 | Gardiner et al. |
| 2011/0212629 A1 | 9/2011 | Ivanov et al. |
| 2011/0251354 A1 | 10/2011 | Marechal |
| 2012/0070613 A1 | 3/2012 | Stowers et al. |
| 2012/0223418 A1 | 9/2012 | Stowers et al. |
| 2013/0066086 A1 | 3/2013 | Rogers |
| 2014/0073785 A1 | 3/2014 | Burke et al. |
| 2014/0119977 A1 | 5/2014 | Gatineau et al. |
| 2014/0353648 A1 | 12/2014 | Abe et al. |
| 2015/0056542 A1 | 2/2015 | Meyers et al. |
| 2015/0064839 A1 | 3/2015 | Choi et al. |
| 2015/0210430 A1 | 7/2015 | Naito et al. |
| 2015/0221519 A1 | 8/2015 | Marks et al. |
| 2015/0253667 A1 | 9/2015 | Bristol et al. |
| 2016/0116839 A1 | 4/2016 | Meyers et al. |
| 2017/0102612 A1 | 4/2017 | Meyers et al. |
| 2019/0153001 A1 | 5/2019 | Cardineau et al. |
| 2019/0308998 A1 | 10/2019 | Cardineau et al. |
| 2019/0310552 A1 | 10/2019 | Asano et al. |
| 2019/0315781 A1 | 10/2019 | Edson et al. |
| 2019/0337969 A1 | 11/2019 | Odedra et al. |
| 2019/0354010 A1 | 11/2019 | Minegishi et al. |
| 2019/0391486 A1 | 12/2019 | Jiang et al. |
| 2020/0239498 A1 | 7/2020 | Clark et al. |
| 2020/0241413 A1 | 7/2020 | Clark et al. |
| 2020/0326627 A1 | 10/2020 | Jiang et al. |
| 2020/0348591 A1 | 11/2020 | Kim et al. |
| 2020/0356000 A9 | 11/2020 | Minegishi et al. |
| 2021/0013034 A1 | 1/2021 | Wu et al. |
| 2021/0214379 A1 | 7/2021 | Odedra et al. |
| 2021/0269461 A1 | 9/2021 | Kung et al. |
| 2022/0002323 A1 | 1/2022 | Ermert et al. |
| 2022/0064192 A1 | 3/2022 | Edson et al. |
| 2022/0139864 A1 | 5/2022 | Nitta et al. |
| 2022/0153763 A1 | 5/2022 | Ermert et al. |
| 2022/0187705 A1 | 6/2022 | Jiang et al. |
| 2022/0242888 A1 * | 8/2022 | Kuiper .................. C07F 7/2296 |
| 2022/0306657 A1 | 9/2022 | Fabulyak et al. |
| 2022/0402945 A1 | 12/2022 | Ermert et al. |
| 2022/0402946 A1 | 12/2022 | Sim et al. |
| 2023/0095666 A1 | 3/2023 | Arkles et al. |
| 2023/0098280 A1 | 3/2023 | Kuiper |
| 2023/0126125 A1 | 4/2023 | Ermert et al. |
| 2023/0143592 A1 | 5/2023 | Jiang et al. |
| 2023/0203068 A1 | 6/2023 | Pan et al. |
| 2023/0279546 A1 | 9/2023 | Arkles et al. |
| 2023/0303596 A1 | 9/2023 | Ermert et al. |
| 2023/0374338 A1 | 11/2023 | Jilek et al. |
| 2023/0391803 A1 | 12/2023 | Ermert et al. |
| 2023/0391804 A1 | 12/2023 | Yang et al. |
| 2024/0002412 A1 | 1/2024 | Ermert et al. |
| 2024/0116957 A1 | 4/2024 | Yang |
| 2024/0124500 A1 | 4/2024 | Yang |
| 2024/0158422 A1 | 5/2024 | Yang et al. |
| 2024/0270764 A1 * | 8/2024 | Fukui .................. C07F 7/2296 |
| 2024/0280176 A1 * | 8/2024 | Uehara .................. B01J 31/12 |
| 2024/0336639 A1 * | 10/2024 | Fukui .................. C08F 214/262 |
| 2024/0376134 A1 | 11/2024 | Yang et al. |
| 2024/0387173 A1 | 11/2024 | Liu et al. |
| 2025/0101051 A1 | 3/2025 | Yang et al. |
| 2025/0154178 A1 | 5/2025 | Yang et al. |
| 2025/0155798 A1 | 5/2025 | Hioki et al. |
| 2025/0179100 A1 | 6/2025 | Hioki |
| 2025/0179101 A1 | 6/2025 | Tokumi et al. |
| 2025/0222492 A1 | 7/2025 | Ishii et al. |
| 2025/0222496 A1 | 7/2025 | Ishii et al. |

FOREIGN PATENT DOCUMENTS

| | | |
|---|---|---|
| CN | 103172653 A | 6/2013 |
| CN | 113534609 A | 10/2021 |
| CN | 115996934 A | 4/2023 |
| EP | 1166900 A2 | 1/2002 |
| EP | 1491492 A1 | 12/2004 |
| EP | 1760085 A1 | 3/2007 |
| EP | 1983073 A1 | 10/2008 |
| JP | S61291592 A | 12/1986 |
| JP | H03120290 A | 5/1991 |
| JP | 2002371084 A | 12/2002 |
| JP | 2006159090 A | 6/2006 |
| JP | 2008-091215 A | 4/2008 |
| JP | 2008181796 A | 8/2008 |
| JP | 2012203061 A | 10/2012 |
| JP | 2013143527 A | 7/2013 |
| JP | 2018502173 A | 1/2018 |
| JP | 2019-500490 A | 1/2019 |
| JP | 2020122959 A | 8/2020 |
| JP | 2021-021953 A | 2/2021 |
| JP | 2021503482 A | 2/2021 |
| JP | 2021-519340 A | 8/2021 |
| JP | 2021523403 A | 9/2021 |
| JP | 2021-528536 A | 10/2021 |
| JP | 2023-027078 A | 3/2023 |
| JP | 2023539735 A | 9/2023 |
| KR | 20210044593 A | 4/2021 |
| KR | 20210103950 A | 8/2021 |
| KR | 20210128793 A | 10/2021 |
| TW | 223619 B | 5/1994 |
| TW | 201631377 A | 9/2016 |
| TW | 201831570 A | 9/2018 |
| TW | 202006168 A | 2/2020 |
| TW | 202028215 A | 8/2020 |
| TW | 202105087 A | 2/2021 |
| TW | 202111044 A | 3/2021 |
| TW | 1752308 B | 1/2022 |
| TW | 202212970 A | 4/2022 |
| TW | 202230049 A | 8/2022 |
| TW | 202246293 A | 12/2022 |
| TW | 202300499 A | 1/2023 |
| TW | 202323261 A | 6/2023 |
| TW | 202330997 A | 8/2023 |
| WO | 8607615 A1 | 12/1986 |
| WO | 8705037 A1 | 8/1987 |
| WO | 0195690 A1 | 12/2001 |
| WO | 0214328 A1 | 2/2002 |
| WO | 2003091186 A2 | 11/2003 |
| WO | 2009138474 A1 | 11/2009 |
| WO | 2012012026 A2 | 1/2012 |
| WO | 2013143745 A1 | 10/2013 |
| WO | 2013172466 A1 | 11/2013 |
| WO | 2014025937 A1 | 2/2014 |
| WO | 2017066319 A2 | 4/2017 |
| WO | 2017156388 A1 | 9/2017 |
| WO | 2018031896 A1 | 2/2018 |
| WO | 2018123388 A1 | 7/2018 |
| WO | 2018139109 A1 | 8/2018 |
| WO | 2019023797 A1 | 2/2019 |
| WO | 2019199467 A1 | 10/2019 |
| WO | 2020102085 A1 | 5/2020 |
| WO | 2020132281 A1 | 6/2020 |
| WO | 2020264557 A1 | 12/2020 |
| WO | 2020264571 A1 | 12/2020 |
| WO | 2022046736 A1 | 3/2022 |
| WO | 2022165381 A1 | 8/2022 |
| WO | 2023006871 A1 | 2/2023 |
| WO | 2023114214 A1 | 6/2023 |
| WO | 2023209506 A1 | 11/2023 |
| WO | 2023235534 A1 | 12/2023 |

(56) References Cited

FOREIGN PATENT DOCUMENTS

| WO | 2023245047 A1 | 12/2023 |
| WO | 2024035914 A1 | 2/2024 |
| WO | 2024181551 A1 | 9/2024 |
| WO | 2025054054 A2 | 3/2025 |
| WO | 2025170981 A2 | 8/2025 |

OTHER PUBLICATIONS

Cannon Instrument Company, "Cannon Catalog 2007-2008: Innovations in Viscosity Measurement," pp. 1-74.
Cardineau et al., "EUV Resists based on Tin-Oxo Clusters," Proc. of SPIE, Advances in Patterning Materials and Processes XXXI, vol. 9051, pp. 90511B-1-90511B-12 (2014).
Cardineau et al., "Photolithographic properties of tin-oxo clusters using extreme ultraviolet light (13.5 nm)," Microelectronic Engineering, vol. 127, pp. 44-50 (2014).
Chukhajian et al., "Synthesis of Mixed Secondary and Tertiary Amines," Russian Journal of Organic Chemistry, vol. 56, No. 2, pp. 353-355 (2020).
Cochran et al., "Kinetics of the Protodestannylation of Vinyltrialkyltins and Substituted Vinyltrialkyltins," Organometallics, vol. 1, No. 4, pp. 586-590 (1982).
Das et al., "Synthesis of Oxazolidinones by a Hypervalent Iodine Mediated Cyclization of N-Allylcarbamates," Adv. Synth. Catal., vol. 363, pp. 1646-1650 (2021).
Del Re et al., "Low-LER Tin Carboxylate Photoresists using EUV," Extreme Ultraviolet (EUV) Lithography VI, Proc. of SPIE, vol. 9422 (2015).
Ding et al., "Radical-Induced Formation of Some Siloles and Diazasiloles," J. Org. Chem., vol. 67, No. 25, pp. 8906-8910 (2002).
Eujen et al., "Preparation and Properties of Trifluoromethyl-Substituted Stannanes," J. Organomet. Chem., vol. 434, No. 2, pp. 159-168 (1992) (Abstract Only).
Fallica et al., "Absorption coefficient and exposure kinetics of photoresists at EUV," Proc. of SPIE, vol. 10143, pp. 101430A-1-101430A-11 (2017).
Haitjema et al., "Extreme ultraviolet patterning of tin-oxo cages," Journal of Micro/Nanolithography, MEMS, and MOEMS, vol. 16, No. 3, pp. 033510-1-033510-8 (2017).
Hänssgen et al., "Synthese der ersten mono-t-butylzinn-elementverbindungen," Journal of Organometallic Chemistry, vol. 293, pp. 191-195 (1985).
International Search Report and Written Opinion issued Jun. 10, 2022 in International Application No. PCT/US2021/056936.
International Search Report and Written Opinion issued Oct. 5, 2023 in Int'l Application No. PCT/US2023/024227.
Jones et al., "Amino-derivatives of Metals and Metalloids. Part I. Preparation of Aminostannanes, Stannylamines, and Stannazanes," J. Chem. Soc., pp. 1944-1951 (1965).
Jousseaume et al., "General Routes to Functional Organotin Trichlorides and Trialkoxides Involving the Tricyclohexylstannyl Group," Organometallics, vol. 14, pp. 685-689 (1995).
Khrustalev et al., "New stable germylenes, stannylenes, and related compounds. 8. Amidogermanium(II) and -tin(II) chlorides R2N-E14-Cl (E14=Ge, R=Et; E14=Sn, R=Me) revealing new structural motifs," Applied Organometallic Chemistry, vol. 21, pp. 551-556 (2007).
Lorberth et al., "Evidence for Sn—N pi-Bonding: Dipole Moments of Aminostannanes," Journal of Organometallic Chemistry, vol. 19, pp. 203-206 (1969).
Lorberth, J., "Spaltung der zinn-stickstoff-bindung: (dialkylamino)-stannane und ihre reaktionen mit alkylierungsmitteln," Journal of Organometallic Chemistry, vol. 16, No. 2, pp. 235-248 (1969).
Molloy, K. C., "Precursors for the formation of tin(IV) oxide and related materials," Journal of Chemical Research, pp. 549-554 (2008).
Office Action issued Feb. 11, 2022 in U.S. Appl. No. 17/512,944, by Arkles.
Office Action issued Oct. 26, 2023 in U.S. Appl. No. 18/232,945 by Yang et al.
Office Action issued Mar. 15, 2023 in TW Application No. 110141022 (partial translation).
Pigarev et al., "The effect of substituents on the structure and reactivity of organogermanium anions," Journal of Organometallic Chemistry, vol. 369, pp. 29-41 (1989).
Sakai et al., "Progress in metal organic cluster EUV photoresists," J. Vac. Sci. Technol. B, vol. 36, No. 6, pp. 06J504-1-06J504-3 (2018).
Search Report issued Aug. 19, 2022 in TW Application No. 110141022.
Search Report issued Mar. 9, 2023 in TW Application No. 110141022.
Seyferth, D., "The Grignard Reagents," Organometallics, vol. 28, No. 6, pp. 1598-1605 (2009).
Stanley et al., "Atmospheric pressure chemical vapour deposition of fluorine-doped tin(IV) oxide from fluoroalkyltin precursors," Applied Organometallic Chemistry, vol. 19, pp. 644-657 (2005).
Tansjo, L., "N-Substituted Alkyltriaminosilanes," ACTA Chemica Scandinavica, vol. 11, No. 10, pp. 1613-1621 (1957).
Tuyen et al., "Nanomechanical and Material Properties of Fluorine-Doped Tin Oxide Thin Films Prepared by Ultrasonic Spray Pyrolysis: Effects of F-Doping," Materials, vol. 12, No. 10, 1665, pp. 1-12 (2019).
Van Den Berghe et al., "A study of the 1H and 119Sn NMR spectra of (CH3)4-nSn(NR2)n compounds (R=CH3, C2H5)," Journal of Organometallic Chemistry, vol. 61, pp. 197-205 (1973).
Van Mol, A.M.B., "Chemical vapour deposition of tin oxide thin films," Ph.D. Thesis, Eindhoven University of Technology, pp. 1-176(2003).
Warner E., "Atomic Layer Deposition of Tin Oxide and Zinc Tin Oxide: Understanding the Reactions of Alkyl Metal Precursors with Ozone," A Dissertation Submitted to the Faculty of University of Minnesota, pp. i-139 (2014).
Wiley-VCH Verlag GmbH & Co. KGaA, "Distillates (petroleum)(, hydrotreated light," The MAK Collection for Occupational Health and Safety, pp. 1791-1803 (2016) . . . .
Zhang et al., "The characterization of fluorine doped tin oxide films by Fourier Transformation Infrared spectrum," Materials Letters, vol. 64, pp. 2707-2709 (2010).
Zuiderweg, F.J., "Laboratory Manual of Batch Distillation," Interscience Publishers, Inc., pp. v-viii, 1 and 74-97 (1957).
Eychenne-Baron et al., "Reaction of Butyltin Hydroxide Oxide with p-Toluenesulfonic Acid: Synthesis, X-ray Crystal Analysis, and Multinuclear NMR Characterization of {(BuSn) 12O14(OH)6}(4-CH3C6H4SO3)2," Organometallics, vol. 19, pp. 1940-1949 (2000).
Eychenne-Baron et al., "New synthesis of the nanobuilding block {(BuSn) 12O14(OH)6}2+ and exchange properties of {(BuSn)12O14(OH)6}(O3SC6H4CH3)2", Journal of Organometallic Chemistry vol. 567, pp. 137-142 (1998).
Puff et al., "Zur Hydrolyse von Monoorganylzinn-trihalogeniden (III. Isolierung und Roentgenstrukturanalyse von Verbindungen mit dem neuartigen Kaefig-Ion[(i-PrSn)12O14(OH)6]2+", Journal of Organometallic Chemistry, vol. 373, pp. 173-184 (1989) (English Abstract Only).
Furniss et al., "Vogel's Textbook of Practical Organic Chemistry: Experimental Techniques," John Wiley & Sons, Inc., New York, pp. 169-190 (1989).
International Search Report and Written Opinion issued Feb. 5, 2024 in Int'l Application No. PCT/US2023/033801.
Office Action issued Mar. 8, 2024 in U.S. Appl. No. 18/205,009 by Yang et al.
International Search Report and Written Opinion issued Jan. 16, 2024 in Int'l Application No. PCT/US2023/030045.
Pratihar et al., "Reactivity and Selectivity of Organotin Reagents in Allylation and Arylation: Nucleophilicity Parameter as a Guide," Organometallics, vol. 30, No. 12, pp. 3257-3269 (2011).
Elhamzaoui et al., "A doubly folded spacer in a self-assembled hybrid material," Chem. Commun., pp. 1304-1306 (2006).
Notice of Allowance issued Jul. 24, 2024 in U.S. Appl. No. 18/373,404, by Yang.
Office Action issued Nov. 20, 2023 in U.S. Appl. No. 18/205,009 by Yang et al.

(56) References Cited

OTHER PUBLICATIONS

Office Action issued Dec. 1, 2023 in U.S. Appl. No. 18/373,404, by Yang.
Ossig et al., "Synthesis and X-ray Crystal Structure of a Stannaimine," Journal of the Chemical Society, Chemical Communications, pp. 497-499 (1993).
Office Action issued Mar. 26, 2024 in TW Application No. 112130357.
Office Action issued Apr. 8, 2024 in TW Application No. 112120747.
Accession No. 1995:174817, Chemical Abstract Service, CAPLUS databse (published in 1995; retrieved on Jan. 25, 2025) (1995).
Graf, G., "Tin, Tin Alloys, and Tin Compounds," Ullmann's Encyclopedia of Industrial Chemistry, vol. 37, pp. 1-34 (2012).
International Preliminary Report on Patentability issued Dec. 12, 2024 in Int'l Application No. PCT/US2023/024227.
International Search Report and Written Opinion issued Mar. 25, 2025, in International Application No. PCT/US2024/045360.
International Search Report and Written Opinion issued Apr. 11, 2025, in International Application No. PCT/US2024/054069.
International Search Report and Written Opinion issued May 8, 2025 in International Application No. PCT/US2024/061753.
International Search Report and Written Opinion issued May 9, 2025 in International Application No. PCT/US2024/061775.
Jaumier et al., "New route to monoorganotin oxides and alkoxides from trialkynylorganotins," Chem. Commun., vol. 3, pp. 369-370 (1998).
Jaumier et al., "Transmetalation of Tetraalkynyltin Compounds with Grignard Reagents: Access to Mono- and Dialkyltin Products," Angew. Chem. Int. Ed., vol. 38, No. 3, pp. 402-404 (1999).
Lappert et al., "Subvalent group 14 metal compounds; XI. Oxidative addition reactions of organic halides or acid anhydrides (including CH4-nCln, PhBr, BrN(SiMe3)2, ButCOCl, or (CF3CO)2O) to some bivalent group 14 metal amides or alkyls," Journal of Organometallic Chemistry, vol. 330, pp. 31-46 (1987).
Notice of Allowance issued Dec. 25, 2024 in TW Application No. 112120747.
Office Action issued Jan. 2, 2025 in U.S. Appl. No. 18/420,894, by Yang et al.
Office Action issued Jan. 30, 2025 in U.S. Appl. No. 18/243,318, by Yang et al.
Office Action issued Mar. 21, 2025 in U.S. Appl. No. 18/821,070, by Hioki.
Office Action issued May 14, 2025 in U.S. Appl. No. 18/196,579, by Arkles.
Partial International Search Report issued May 2, 2025 in International Application No. PCT/US2024/057488.
Ribot et al., "Sol-Gel Synthesis of Hybrid Organic-Inorganic Tin Oxide Based Materials," Mat. Res. Soc. Symp. Proc., vol. 346, pp. 121-126 (1994).
Office Action issued Nov. 7, 2024 in U.S. Appl. No. 18/205,009 by Yang.
Office Action issued May 21, 2025 in U.S. Appl. No. 18/821,200, by Hioki.
Decision issued Apr. 22, 2025 in TW Application No. 112130357.
International Search Report and Written Opinion issued Jun. 25, 2025 in International Application No. PCT/US2024/057488.
Office Action and Examination Search Report issued Jun. 3, 2025 in CA Application No. 3231519.
Office Action and Search Report issued Jun. 27, 2025 in TW Application No. 113150162 (machine English translation).
Office Action and Search Report issued Jun. 27, 2025 in TW Application No. 113150164 (machine English translation).
Office Action issued Jul. 1, 2025 in U.S. Appl. No. 18/821,070, by Hioki.
Agur et al., "Organic Derivatives of Tin: Part VIII—Some Insertion Reactions Across Sn-O Bond," Indian Journal of Chemistry, vol. 12, pp. 1193-1196 (1974).
Courtenay et al., "Phosphinimido Complexes of Silicon, Tin, and Germanium," Organometallics, vol. 22, No. 4, pp. 818-825 (2003).
Fouquet et al., "Synthesis of monoorganotins and their use as versatile reagents for organic synthesis," Bulletin de la Societe Chimique de France, vol. 134, Nos. 10 & 11, 959-967 (1997).
Gaur et al., "Organic Derivatives of Tin; V Synthesis and Reactions of Alkyltin Trialkoxides," Journal of Organometallic Chemistry, vol. 63, pp. 221-231 (1973).
International Search Report and Written Opinion issued Nov. 19, 2024 in International Application No. PCT/JP2024/031129.
International Search Report and Written Opinion issued Nov. 19, 2024 in International Application No. PCT/JP2024/031130.
Lorberth et al., "Untersuchungen an Methylzinn-amiden," Chemische Berichte, vol. 98, No. 2, pp. 520-525 (1965).
Notice of Allowance issued Jun. 30, 2025 in U.S. Appl. No. 18/205,009, by Yang.
Office Action and Search Report issued Jul. 4, 2025 in TW Application No. 113141998, with English translation of Search Report.
Office Action issued May 28, 2025 in U.S. Appl. No. 18/420,894, by Yang.
Office Action issued Jun. 3, 2025 in JP Application No. 2024515872.
Office Action issued Jun. 12, 2025 in TW Patent Application No. 113132741.
Office Action issued Jun. 25, 2025 in TW Patent Application No. 113132740.
Ossig et al., "Reactions of a free stannaimine and of base-stabilized stannylenes," Chemische Berichte, vol. 126, No. 10, pp. 2247-2253 (1993) (with English Abstract).
Bonire, J. J., "Reaction of Phenyltin Chlorides with Silver Trifluoroacetate," Polyhedron, vol. 6, No. 3, pp. 397-400 (1987).
International Search Report and Written Opinion issued Aug. 7, 2025 in International Application No. PCT/US2025/014559.
Midha et al., "Some Alkyltin(IV) Trifluoroacetates," Indian Journal of Chemistry, vol. 22A, pp. 211-213 (1983).
Office Action issued Oct. 14, 2025 in JP Application No. 2024-571027.

* cited by examiner

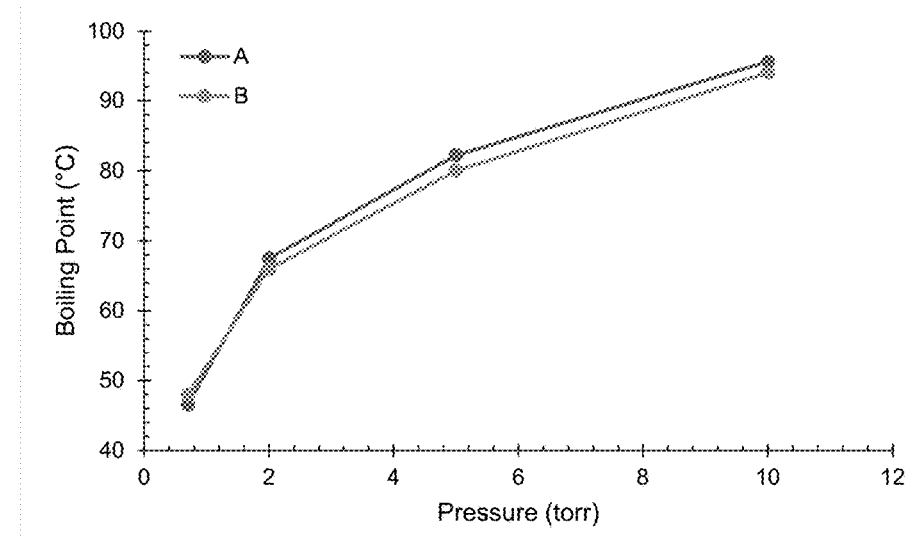
Fig 1. Boiling points of iPrSn(NMe$_2$)$_3$ (A) and iPr$_2$Sn(NMe$_2$)$_2$ (B).
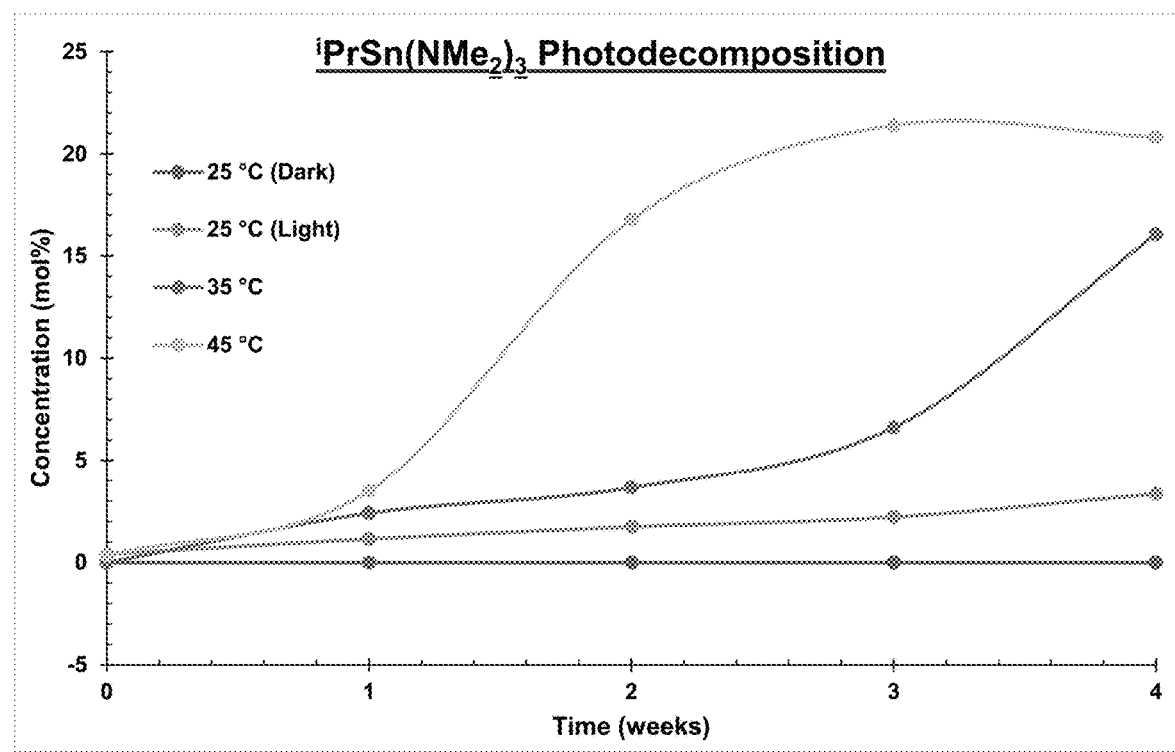
Fig. 2. Photodecomposition of iPrSn(NMe$_2$)$_3$ Over Time

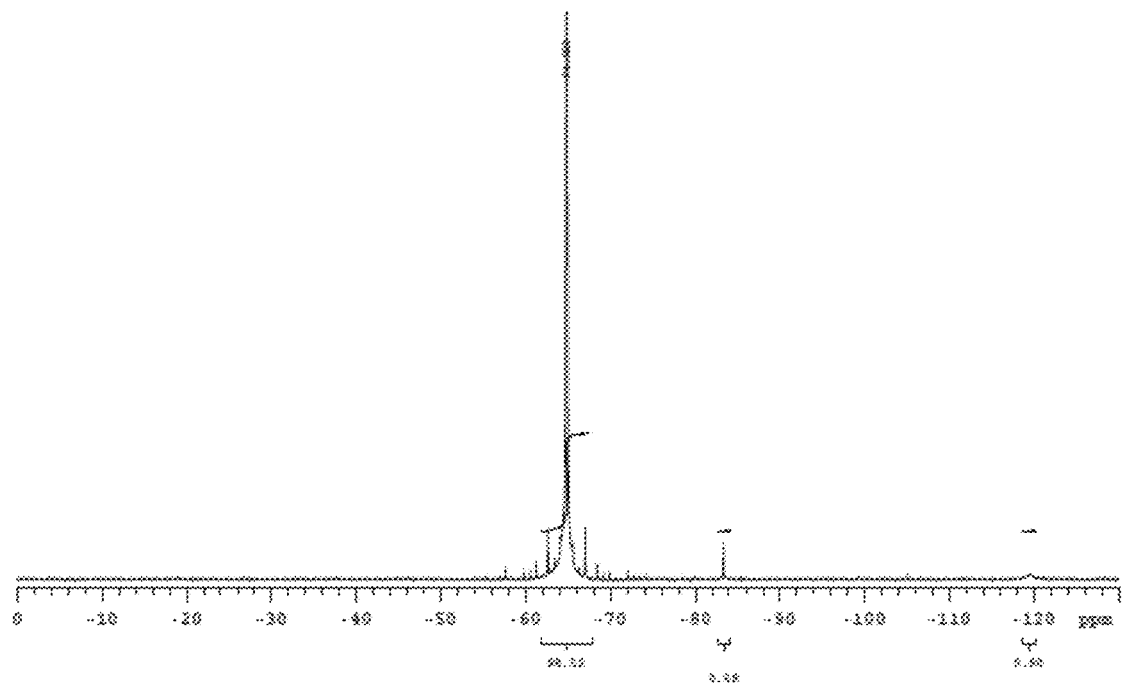
Fig. 3. $^{119}$Sn NMR Showing formation of iPrSn(NMe$_2$)$_2$(NMeCH$_2$NMe$_2$)
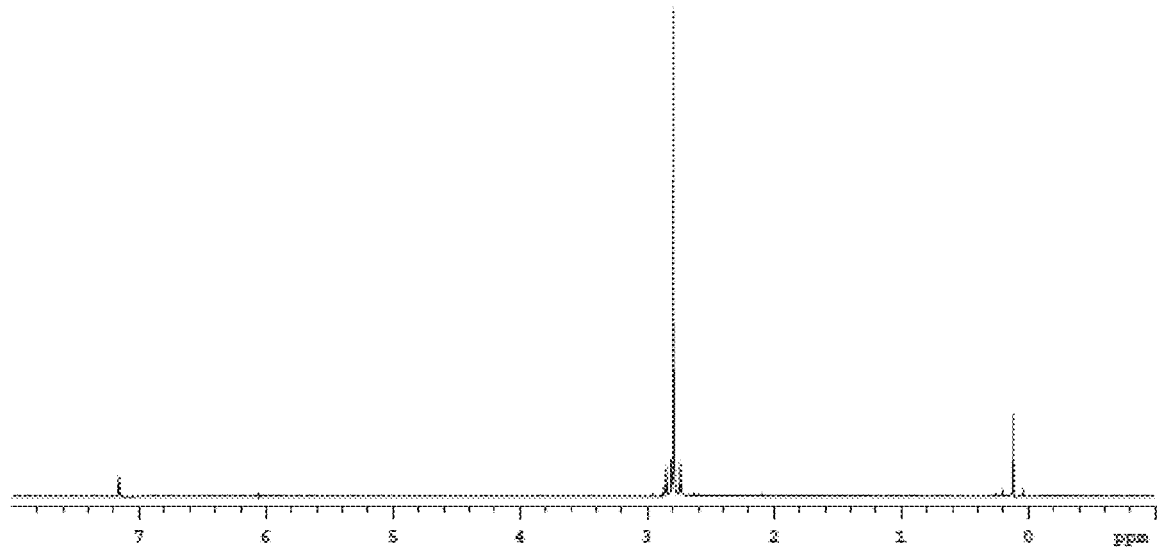
Fig. 4. $^1$H NMR (C$_6$D$_6$) of Methyl tris(dimethylamino)tin

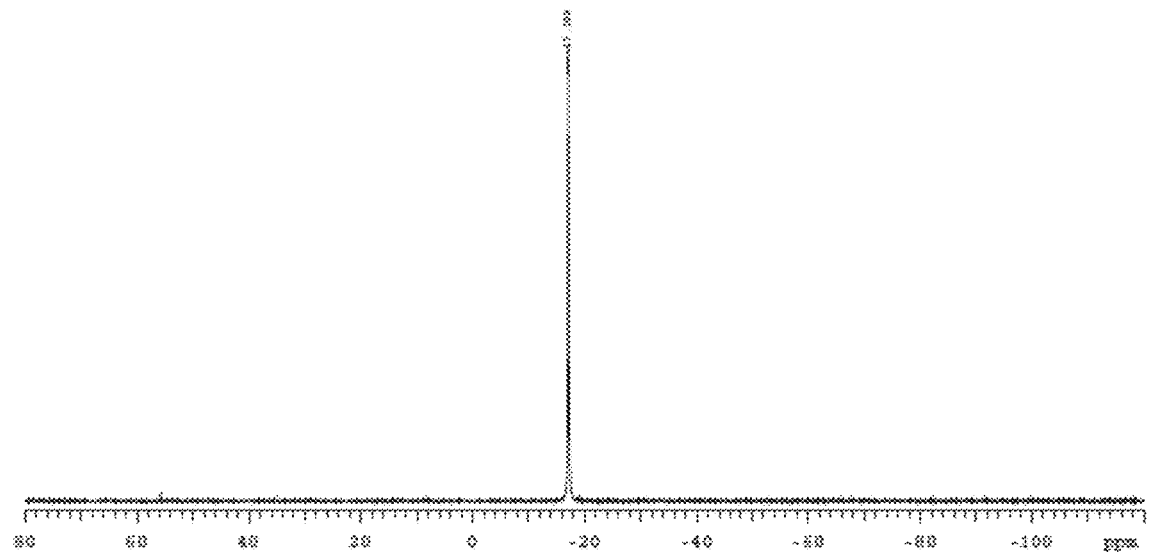
Fig. 5. $^{119}$Sn NMR (neat) of Methyl tris(dimethylamino)tin
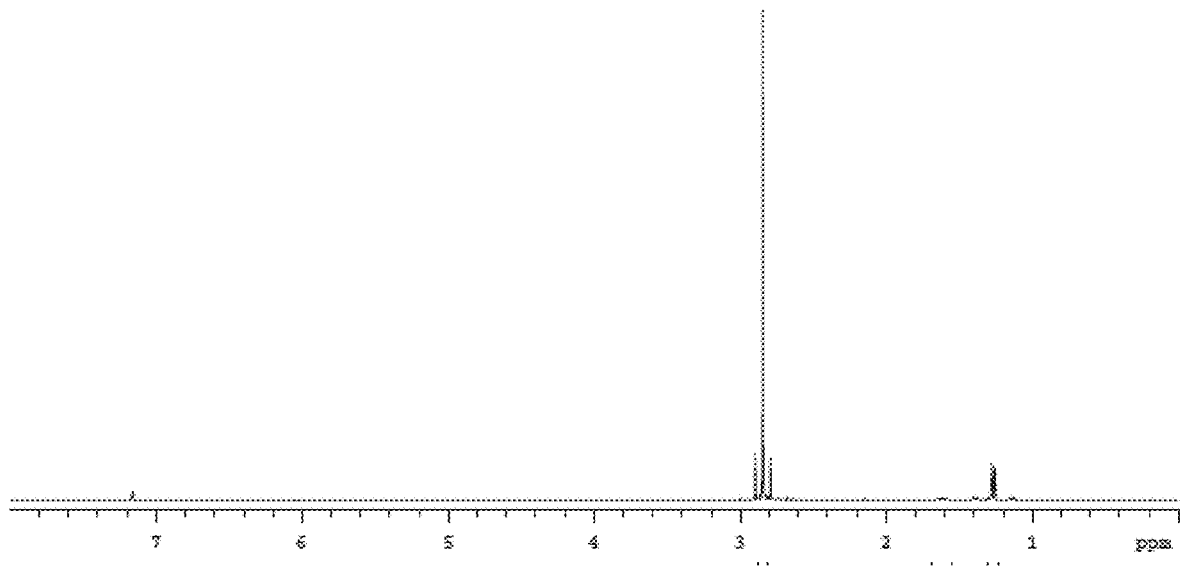
Fig. 6: $^{1}$H NMR (C$_6$D$_6$) of Isopropyl tris(dimethylamino)tin

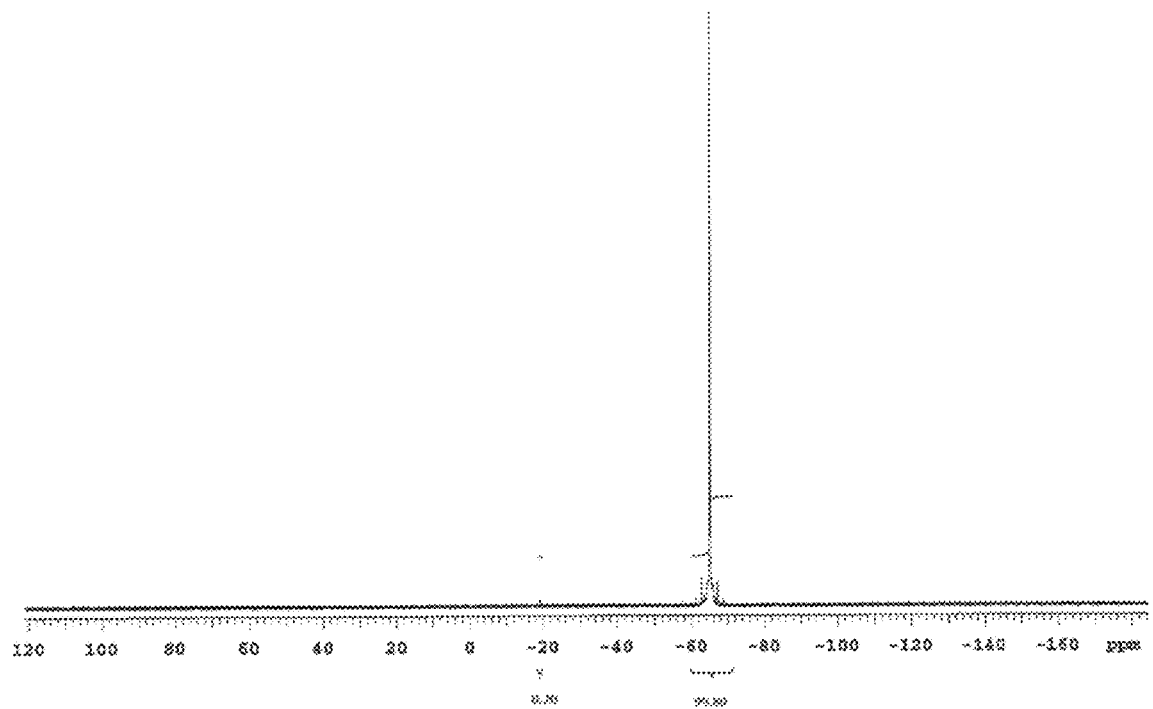
Fig. 7: $^{119}$Sn NMR (neat) of Isopropyl tris(dimethylamino)tin
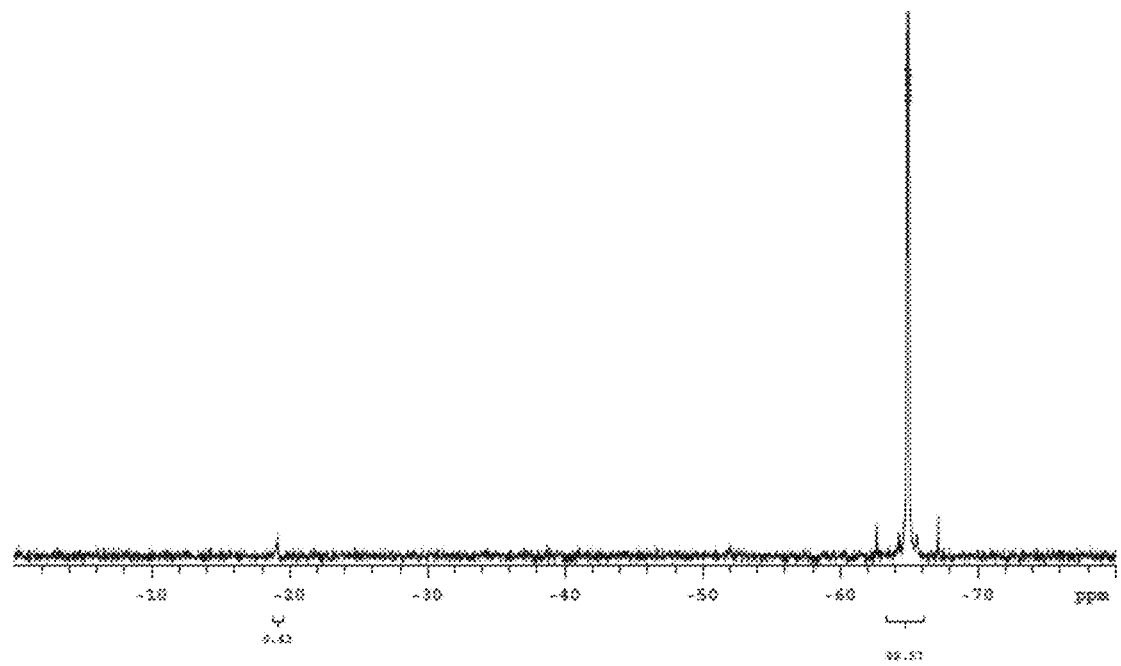
Fig. 8. $^{119}$Sn NMR (neat) of isopropyl tris(dimethylamino)tin synthesized in THF solution

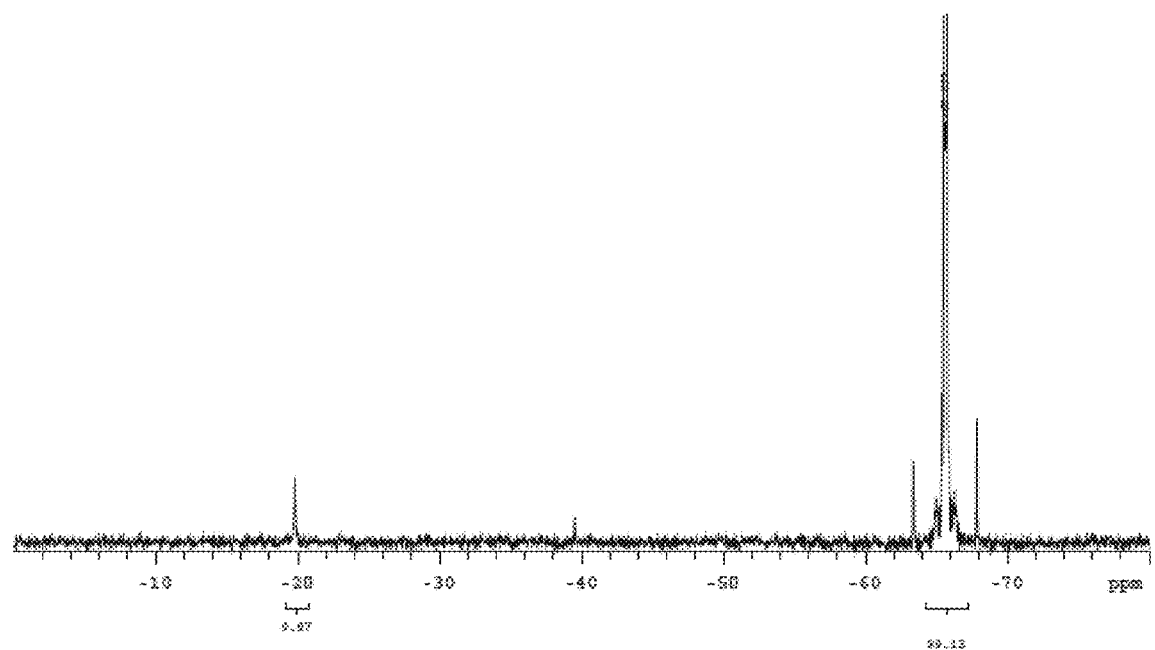
Fig. 9 $^{119}$Sn NMR of Isopropyl tris(dimethylamino)tin synthesized at about 0°C

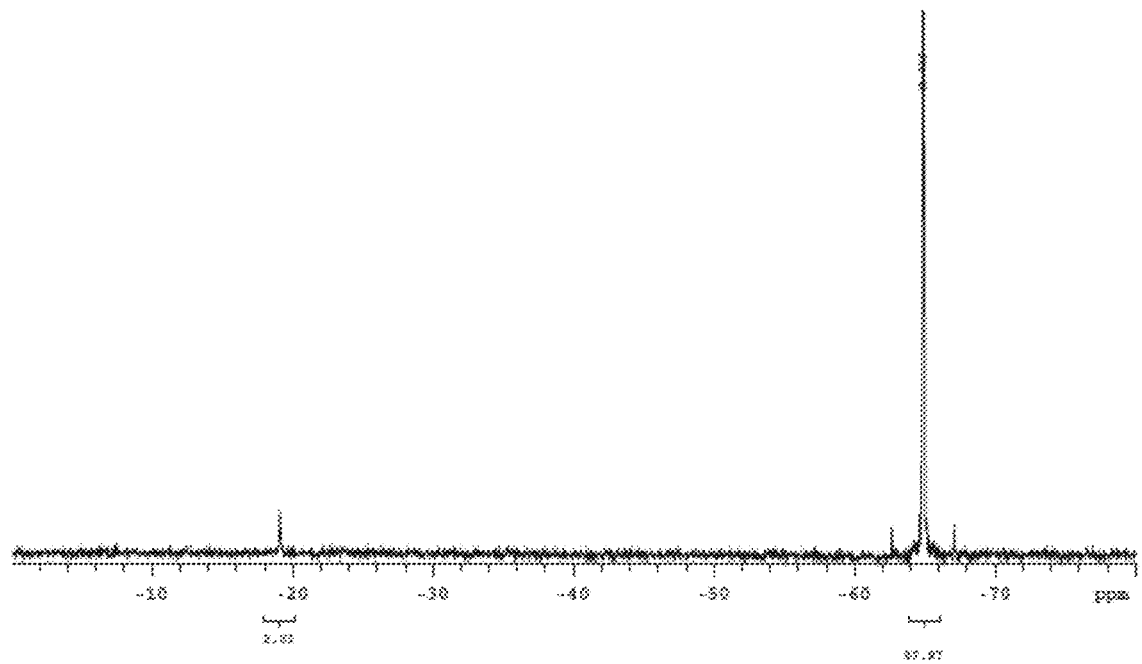
Fig. 10: $^{119}$Sn NMR of Isopropyl tris(dimethylamino)tin synthesized at about -40°C
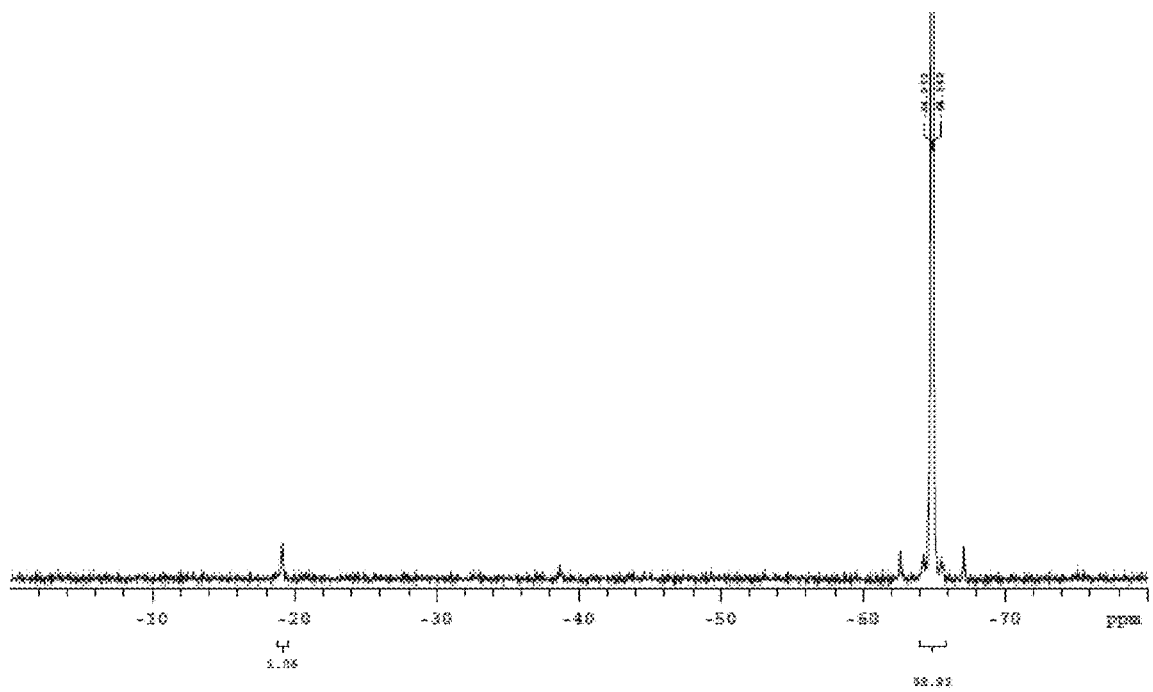
Fig. 11: $^{119}$Sn NMR of Isopropyl tris(dimethylamino)tin synthesized at about -78°C

METHOD OF STORING HIGH PURITY ALKYL TIN COMPOUNDS

CROSS-REFERENCE TO RELATED APPLICATION

This application is a divisional of co-pending U.S. application Ser. No. 18/205,009, filed Jun. 2, 2023, which claims priority to U.S. Provisional Application No. 63/348,173, filed Jun. 2, 2022, the disclosures of which are herein incorporated by reference in their entirety.

BACKGROUND OF THE INVENTION

As semiconductor fabrication continues to advance, feature sizes continue to shrink, driving the need for new processing methods. Certain organotin compounds have been shown to be useful in the deposition of tin oxide hydroxide coatings in applications such as extreme ultraviolet (EUV) lithography techniques. For example, alkyl tin compounds provide radiation sensitive Sn—C bonds that can be used to pattern structures lithographically.

Materials used in microelectronic fabrication are required to be extremely pure with tight limits placed on organic contamination (e.g., reaction by-products), metallic contamination, and particulate contamination. Purity requirements are stringent in general, and particularly for lithography applications because the chemical is in contact with the semiconductor substrates and the organometallic impurities in compounds such as diisopropylbis(dimethylamino) tin, $3(iPr)_2Sn(NMe_2)_2$, can affect the properties of the resultant film. Exact targets for purities are determined by a variety of factors, including performance metrics, but typical minimum purity targets are 3N+. Residual metals present in the chemicals can be deposited onto the semiconductor substrate and degrade the electrical performance of the device being fabricated. Typical specification for metals are less than 10 ppb for individual metals and total metal not to exceed ~100 ppb.

The processing and performance of semiconductor materials can also be sensitive to dialkyl tin contaminants. Dialkyl tin impurities, $R_2Sn(NMe_2)_2$, where R is an alkyl group, are the source of off-gassing after vapor phase deposition or spin-on coating processes due to the oxostannate cluster films being less dense when the film contains dialkyl groups. To produce microelectronic products using EUV lithography, proper control of dialkyl tin contaminants is required. The high purity required from the mono-alkyl tin precursor manufacturing process becomes a challenge. In general, the syntheses of monoalkyl tin triamides have previously employed lithium dimethylamide reagents reacted with alkyl tin trichloride, or followed by a lithium/Grignard reagent (alkylating agent) to convert the tin tetraamides to the desired triamides.

Kocheshkov-like comproportionation during scheme (I) and the disproportion scheme (II), shown below, during purification are the two main challenges when preparing primary alkyl tin triamides, such as methyl and longer alkyl tin triamides, which contain no more than 1% dialkyl tin after purification. Studies have shown that comproportionation occurs independent of the reaction temperature, down to −78° C. In fact, lower temperatures have been found to slow the substitution reaction, which increases the risk of comproportionation.

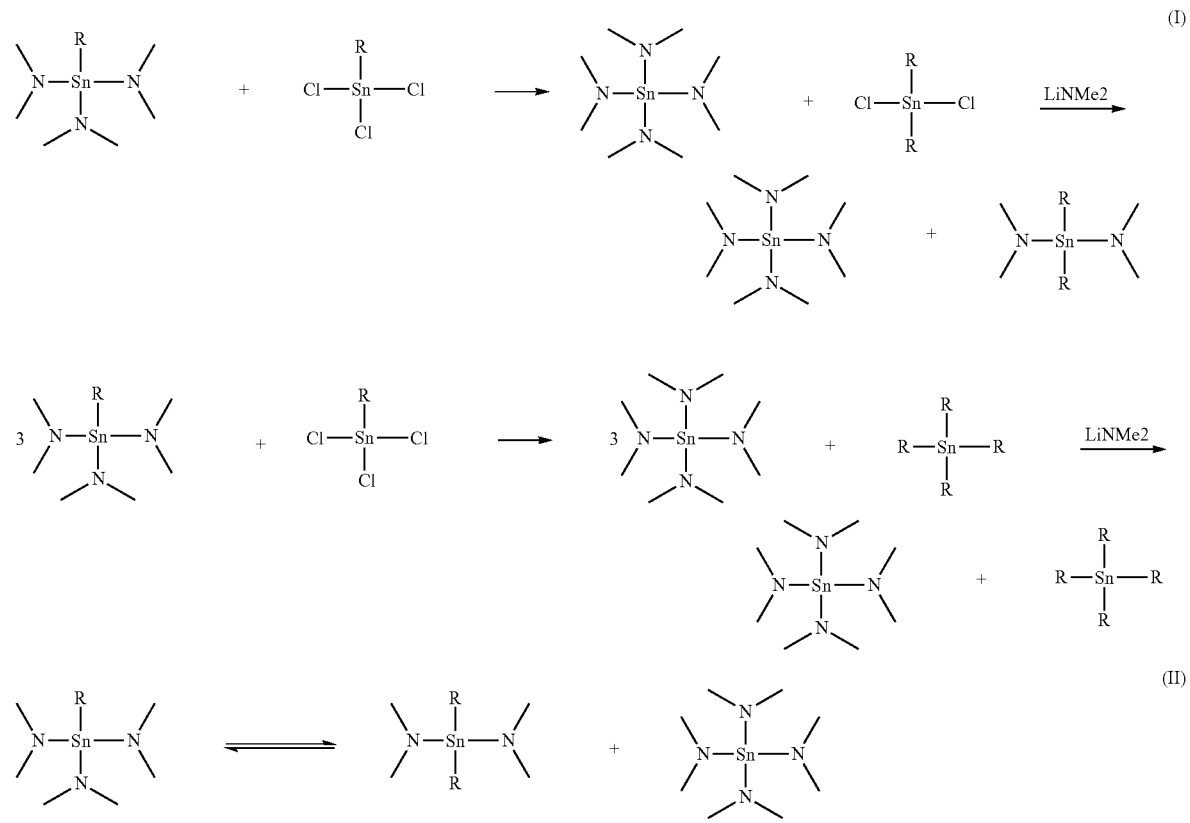

The preparation of monoalkyl tin triamide compounds may be accomplished by two different known synthetic pathways. When the alkyl group contains a primary and/or a secondary moiety, such as methyl tri(dimethylamino)tin (MeSn(NMe$_2$)$_3$) or isopropyl tri(dimethylamino)tin (iPrSn (NMe$_2$)$_3$), the synthesis may be performed using lithium dimethylamide and alkyl tin trichloride (amination) according to the method of Lorberth (*Journal of Organometallic Chemistry*; 16(2), 235-48 (1969)); see also Jones and Lappert (*Organometal. Chem. Rev.*; 1, 67 (1966)), as shown in scheme (III). However, this reaction typically produces significant amounts of dialkyl tin and other tin impurities.

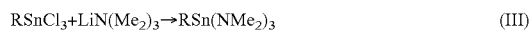

$$RSnCl_3 + LiN(Me_2)_3 \rightarrow RSn(NMe_2)_3 \tag{III}$$

Alternatively, when the alkyl group contains a tertiary alkyl moiety, such as tert-butyl tris(dimethylamino)tin (t-BuSn(NMe$_2$)$_3$), the compounds must be synthesized using an alkylating reagent to convert tin tetraamides by controlling the stoichiometry according to the method reported by Hanssgen et al. (*Journal of Organometallic Chemistry*, 293 (2), 191-5 (1985)), as shown in scheme (IV).

$$RLi + Sn(NMe_2)_4 \rightarrow RSn(NMe_2)_3 \tag{IV}$$

The reaction of scheme (IV) using an alkylating reagent and tetraamides is not effective for the preparation of primary and secondary monoalkyl tin triamide compounds. Rather, the use of a primary alkylating reagent will convert tin tetraamides to trialkyltin amides and unreacted tetraamides, even when using the correct stoichiometry. Secondary alkylating reagents will also convert tin tetraamides to polyalkyl tin compounds.

When the alkyl group in the monoalkyltin triamide compound is a tertiary alkyl group such as t-BuSnCl$_3$, Hanssgen et al. also reports that this compound decomposes rapidly at room temperature, yielding SnCl$_2$ and t-BuCl. Therefore, tertiary monoalkyl tin triamide compounds cannot be prepared by synthesis with lithium dimethylamide and alkyl tin trichloride.

Distillation is a well-developed technology for separating materials in a mixture based on their relative volatility. The exact embodiment of the distillation process depends on the properties, the composition, and the amount of the mixture to be separated. Distillation can and has been used to reduce metallic contamination in multitudes of materials, including organometallic compounds.

For example, U.S. Patent Application Publication No. 2019/0337969 describes organometallic tin compounds which have low concentrations of metallic impurities as a result of a multistage distillation process which is compared to processes typically used for sea water desalination. U.S. Patent Application Publication No. 2020/0239498 describes the purification of monoalkyl tin trialkoxides and monoalkyl tin triamides using fractional distillation and/or ultrafiltration for the removal of metal impurities and fine particulates. The removal of metallic impurities from similar compounds is also described in U.S. Patent Application Publication No. 2020/0241413.

U.S. Pat. Nos. 10,787,466 and 10,732,505 describe organotin hydroxide, alkoxide, and amide compounds having low purity. However, extremely low levels of impurity have only been demonstrated for t-butyl analogs.

U.S. Pat. No. 8,901,335 describes the purification of a long list of organometallic compounds using a stripping column and a gas stream; the more volatile impurities relative to the organometallic compound are removed and the metallic impurity contents are reduced to specified levels. U.S. Pat. No. 11,156,915 relates to the purification of actinic ray- or radiation-sensitive compounds, including tin compounds, using filtration to remove particulates. Finally, U.S. Pat. No. 5,274,149 teaches a process for making alkyl arsine compounds which includes a distillation step, and which are taught to contain substantially no metallic or oxygenating impurities.

The ability to prepare and isolate alkyl-amino tin compounds having desired extremely high purity levels would be very attractive for use in the microelectronic industry.

BRIEF SUMMARY OF THE INVENTION

In one aspect of the disclosure, provided is a monoalkyl tin triamide compound having formula (1) and having a purity of at least about 99 mol %:

$$R^1Sn(NR^2_2)_3 \tag{1}$$

wherein R$^1$ is selected from R$^A$, R$^B$, and R$^C$;
R$^A$ is a primary alkyl group having about 1 to 10 carbon atoms, R$^B$ is a secondary alkyl group having about 3 to 10 carbon atoms, and R$^C$ is a tertiary alkyl group having about 3 to 10 carbon atoms;
each R$_2$ is independently an alkyl group having about 1 to 10 carbon atoms; and
wherein a content of R$^1$Sn(NR$^2_2$)$_2$(N(R$^2$)CH$_2$NR$^2_2$) is less than about 1 mol %.

In another aspect of the disclosure, provided is a method of synthesizing a monoalkyl tin triamide compound having formula (1a) and having a purity of at least about 85 mol %:

$$R^1Sn(NR^2_2)_3 \tag{1a}$$

wherein R$^1$ is selected from R$^A$ and R$^B$;
R$^A$ is a primary alkyl group having about 1 to 10 carbon atoms and R$^B$ is a secondary alkyl group having about 3 to 10 carbon atoms; and
each R$^2$ is independently an alkyl group having about 1 to 10 carbon atoms; the method comprising:
(a) lithiating a solution comprising a dimethylamine and a first solvent to produce a lithium dimethylamide solution having a concentration of up to about 10 wt %;
(b) adding a solution comprising an alkyl trichlorotin and a second solvent; wherein the amount of lithium dimethylamide in the solution is at least about 3.09 equivalents relative to the amount of alkyl trichlorotin;
(c) removing the LiCl salt product by filtration; and
(d) removing the first solvent and the second solvent under vacuum to produce a crude product containing the monoalkyl tin triamide having formula (1a).

In a further aspect of the disclosure, provided is a method of storing a sample of a monoalkyl tin triamide compound having formula (1) and having a purity of at least about 99 mol %:

$$R^1Sn(NR^2_2)_3 \tag{1}$$

wherein R$^1$ is selected from R$^A$, R$^B$, and R$^C$;
R$^A$ is a primary alkyl group having about 1 to 10 carbon atoms, R$^B$ is a secondary alkyl group having about 3 to 10 carbon atoms, and R$^C$ is a tertiary alkyl group having about 3 to 10 carbon atoms;
each R$^2$ is independently an alkyl group having about 1 to 10 carbon atoms;
the method comprising storing the sample of the monoalkyltin triamide compound having formula (1) without light exposure and at a temperature of less than about 30° C.

Advantageous refinements of the invention, which can be implemented alone or in combination, are specified in the dependent claims.

In summary, the following embodiments are proposed as particularly preferred in the scope of the present invention:

Embodiment 1: A monoalkyl tin triamide compound having formula (1) and having a purity of at least about 99 mol %:

wherein $R_1$ is selected from $R^A$, $R^B$, and $R^C$;
$R^A$ is a primary alkyl group having about 1 to 10 carbon atoms, $R^B$ is a secondary alkyl group having about 3 to 10 carbon atoms, and $R^C$ is a tertiary alkyl group having about 3 to 10 carbon atoms;
each $R^2$ is independently an alkyl group having about 1 to 10 carbon atoms; and
wherein a content of $R^1Sn(NR^2{}_2)_2(N(R^2)CH_2NR^2{}_2)$ is less than about 1 mol %.

Embodiment 2: The monoalkyl tin triamide compound according to Embodiment 1, wherein a content of dialkyl bis(dialkylamino)tin having formula (2) is less than about 1 mol %.

Embodiment 3: The monoalkyl tin triamide compound according to Embodiment 1 or 2, wherein a total content of tetrakis(dialkylamino)tin is less than about 1 mol %.

Embodiment 4: The monoalkyl tin triamide compound according to any of the preceding Embodiments, wherein a content of tetraalkyl tin is less than about 1 mol %.

Embodiment 5: The monoalkyl tin triamide compound according to any of the preceding Embodiments, wherein the color is substantially colorless.

Embodiment 6: The monoalkyl tin triamide compound according to Embodiment 5, wherein an APHA is less than about 20.

Embodiment 7: The monoalkyl tin triamide compound according to any of the preceding Embodiments, wherein $R^1$ is an isopropyl group, $R^2$ is a methyl group, and the compound has formula (3):

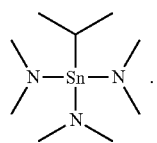

Embodiment 8: The monoalkyl tin triamide compound according to Embodiment 7, wherein a content of diisopropylbis(dimethylamino)tin is less than about 1 mol %.

Embodiment 9: The monoalkyl tin triamide compound according to Embodiment 8, wherein a total content of tetrakis(dimethylamino)tin is less than about 1 mol %.

Embodiment 10: The monoalkyl tin triamide compound according to any of the preceding Embodiments, wherein the content of $R^1Sn(NR^2{}_2)_2(N(R^2)CH_2NR^2{}_2)$ is less than about 0.05 mol %.

Embodiment 11: A method of synthesizing a monoalkyl tin triamide compound having formula (1a) and having a purity of at least about 85 mol %:

wherein $R^1$ is selected from $R^A$ and $R^B$;
$R^A$ is a primary alkyl group having about 1 to 10 carbon atoms and $R^B$ is a secondary alkyl group having about 3 to 10 carbon atoms; and
each $R^2$ is independently an alkyl group having about 1 to 10 carbon atoms; the method comprising:
(a) lithiating a solution comprising a dimethylamine and a first solvent to produce a lithium dimethylamide solution having a concentration of up to about 10 wt %;
(b) adding a solution comprising an alkyl trichlorotin and a second solvent; wherein the amount of lithium dimethylamide in the solution is at least about 3.09 equivalents relative to the amount of alkyl trichlorotin;
(c) removing the LiCl salt product by filtration; and
(d) removing the first solvent and the second solvent under vacuum to produce a crude product containing the monoalkyl tin triamide having formula (1a).

Embodiment 12: The method according to Embodiment 11, wherein the compound having formula (1a) has a purity of at least about 99 mol %.

Embodiment 13: The method according to Embodiment 11 or 12, wherein the compound having formula (1a) contains less than about 1 mol % $R^1Sn(NR^2{}_2)_2(N(R^2)CH_2NR^2{}_2)$.

Embodiment 14: The method according to Embodiment 13, wherein the compound having formula (1a) contains less than about 0.05 mol % $R^1Sn(NR^2{}_2)_2(N(R^2)CH_2NR^2{}_2)$.

Embodiment 15: The method according to any of Embodiments 11-14, wherein step (b) is performed at about −78° C. to 40° C.

Embodiment 16: The method according to Embodiment 15, wherein step (b) is performed at about 0° C. to about 10° C.

Embodiment 17: The method according to any of Embodiments 11-16, wherein the first solvent and the second solvent are each independently selected from the group consisting of a hydrocarbon solvent, an aromatic solvent, and an ether solvent.

Embodiment 18: The method according to any of Embodiments 11-17, wherein steps (a) to (d) are performed substantially without light exposure.

Embodiment 19: The method according to any of Embodiments 11-18, wherein steps (a) and (b) are performed in a stainless steel vessel.

Embodiment 20: The method according to Embodiment 11, further comprising distilling the compound having formula (1a).

Embodiment 21: The method according to Embodiment 20, wherein the distillation comprises distilling the crude product having formula (1a) at about 1 torr, discarding any distillate before the boiling point of the monoalkyltin triamide having formula (1a), and collecting the distillate obtained at the boiling point of the monoalkyltin triamide having formula (1a) to yield a product containing at least about 99 mol % monoalkyl tin triamide having formula (1a).

Embodiment 22: The method according to Embodiment 20 or 21, comprising performing a fractional distillation using an operating pressure of about 0.1 to 50 torr and a pot temperature of about 50 to 120° C., wherein the purified monoalkyl tin triamide compound having formula (1a) contains less than about 0.1 mol % of a dialkyl bis(dialkylamino)tin compound having formula (2).

Embodiment 23: The method according to any of Embodiments 20 to 22, comprising performing the distillation substantially without light exposure.

Embodiment 24: The method according to any of Embodiments 20 to 23, comprising performing the distillation using a condenser temperature within about 1-10° C. of the dew point of the monoalkyl tin triamide compound having formula (1a) at the operating pressure and at a reflux ratio of about 10 to 100.

Embodiment 25: The method according to any of Embodiments 20 to 24, wherein the distillation is performed using a stainless steel column packed with a stainless steel packing material.

Embodiment 26: The method according to any of Embodiments 20 to 25, wherein the distillation is performed a light-shielded apparatus comprising glass.

Embodiments 27: A method of storing a sample of a monoalkyl tin triamide compound having formula (1) and having a purity of at least about 99 mol %:

wherein $R^1$ is selected from $R^A$, $R^B$, and $R^C$;
$R^A$ is a primary alkyl group having about 1 to 10 carbon atoms, $R^B$ is a secondary alkyl group having about 3 to 10 carbon atoms, and R c is a tertiary alkyl group having about 3 to 10 carbon atoms;
each $R^2$ is independently an alkyl group having about 1 to 10 carbon atoms;
the method comprising storing the sample of the monoalkyltin triamide compound having formula (1) substantively without light exposure and at a temperature of less than about 30° C.

Embodiment 28: The method according to Embodiment 27, wherein the sample of the monoalkyl tin triamide compound having formula (1) is stored for about three days to about one year.

Embodiment 29: The method according to Embodiment 27 or 28, wherein the sample of the monoalkyltin triamide undergoes substantively no decomposition after a storage time of about three days to about one year.

Embodiment 30: The method according to any of Embodiments 27 to 29, wherein a content of $R^1Sn(NR^2{}_2)_2$ $(N(R^2)CH_2NR^2{}_2)$ in the sample of the monoalkyl tin triamide having formula (1) is less than about 1 mol %.

Embodiment 31: The method according to Embodiment 30, wherein the content of $R^1Sn(NR^2{}_2)_2(N(R^2)CH_2NR^2{}_2)$ in the sample of the monoalkyl tin triamide having formula (1) is less than about 0.05 mol %.

Embodiment 32: The monoalkyl tin triamide compound having formula (1) according to any of Embodiments 1 to 10, wherein $R^1$ is selected from $R^A$ and $R^B$ and the compound is produced by a method comprising:
(a) lithiating a solution comprising a dimethylamine and a first solvent to produce a lithium dimethylamide solution having a concentration of up to about 10 wt %;
(b) adding a solution comprising an alkyl trichlorotin and a second solvent; wherein the amount of lithium dimethylamide in the solution is at least about 3.09 equivalents relative to the amount of alkyl trichlorotin;
(c) removing the LiCl salt product by filtration; and
(d) removing the first solvent and the second solvent under vacuum to produce a crude product containing the monoalkyl tin triamide having formula (1).

Embodiment 33: The method according to Embodiment 32, wherein step (b) is performed at about −78° C. to about 40° C.

Embodiment 34: The method according to Embodiment 33, wherein step (b) is performed at about 0° C. to about 10° C.

Embodiment 35: The method according to any of Embodiments 32-34, wherein the first solvent and the second solvent are each independently selected from the group consisting of a hydrocarbon solvent, an aromatic solvent, and an ether solvent.

Embodiment 36: The method according to any of Embodiments 32-35, wherein steps (a) to (d) are performed substantially without light exposure.

Embodiment 37: The method according to any of Embodiments 32-36, wherein steps (a) and (b) are performed in a stainless steel vessel.

Embodiment 38: The method according to any of Embodiments 32-37, further comprising distilling the compound having formula (1).

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a graph depicting the boiling points of iPrSn$(NMe_2)_3$ (A) and iPr$_2$Sn$(NMe_2)_2$ (B) at different pressures;

FIG. 2 is a graph depicting the photodecomposition of $^i$PrSn$(NMe_2)_3$ over time;

FIG. 3 is a $^{119}$Sn NMR (neat) spectrum depicting the formation of iPrSn$(NMe_2)_2(NMeCH_2NMe_2)$;

FIG. 4 is a $^1$H NMR $(C_6D_6)$ spectrum of methyl tris(dimethylamino)tin;

FIG. 5 is a $^{119}$Sn NMR (neat) spectrum of methyl tris(dimethylamino)tin;

FIG. 6 is a $^1$H NMR $(C_6D_6)$ spectrum of isopropyl tris(dimethylamino)tin;

FIG. 7 is a $^{119}$Sn NMR (neat) spectrum of isopropyl tris(dimethylamino)tin;

FIG. 8 is a $^{119}$Sn NMR (neat) spectrum of isopropyl tris(dimethylamino)tin synthesized in THF solution;

FIG. 9 is a $^{119}$Sn NMR (neat) spectrum of isopropyl tris(dimethylamino)tin synthesized at about 0° C.;

FIG. 10 is a $^{119}$Sn NMR (neat) spectrum of isopropyl tris(dimethylamino)tin synthesized at about −40° C.; and FIG. 11 is a $^{119}$Sn NMR (neat) spectrum of isopropyl tris(dimethylamino)tin synthesized at about −78° C.

DETAILED DESCRIPTION OF THE INVENTION

According to one aspect of the disclosure, provided are monoalkyl tin triamide compounds represented by formula (1) and having a purity of at least about 99 mol %. In a preferred embodiment, the compounds having formula (1) contain no more than about 1 mol % dialkyl bis(dialkylamino)tin compounds having formula (2) relative to the total amount of tin.

In formulas (1) and (2), $R^1$ is selected from $R^A$, $R^B$, and $R^C$. $R^A$ is a primary alkyl group having about 1 to 10 carbon atoms, preferably about 1 to about 5 carbon atoms, including methyl, ethyl, n-propyl, n-butyl, n-pentyl, etc.; preferred are methyl or ethyl groups. $R^B$ is a secondary alkyl (linear alkyl or cycloalkyl) group having about 3 to 10 carbon atoms, more preferably about 3 to about 5 carbon atoms, such as, without limitation, isopropyl, isobutyl, sec-butyl, cyclohexyl, cyclopentyl, cyclobutyl, cyclopropyl, isopentyl, sec-pentyl, etc.; presently preferred are isopropyl and cyclopentyl groups. $R^C$ is a tertiary alkyl group having about 3 to 10 carbon atoms such as tert-pentyl, 3-ethyl 3-pentyl, methyl 3-pentyl, methylcyclopentyl, methylcyclohexyl and the preferred t-butyl.

Each $R^2$ is independently an alkyl group having about 1 to 10 carbon atoms, preferably about 1 to 5 carbon atoms, including methyl, ethyl, propyl, butyl, pentyl, etc.; preferred are methyl or ethyl groups.

In the compound having formula (1), a total content of $R^1Sn(NR^2{}_2)_2(N(R^2)CH_2NR^2{}_2)$, also referred to herein as compound (4), is preferably less than about 1 mol %, preferably even lower as described below. Further, the content of the compound having formula (2) is preferably less than about 1 mol %, preferably even lower as described below.

All numerical ranges expressed in this disclosure encompass all values within the range, including fractional and decimal amounts. Accordingly, the contents of the compounds having formulas (4) and (2) are each independently preferably less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %, less than about 0.05 mol %, less than about 0.04 mol %, less than about 0.03 mol %, less than about 0.02 mol %, less than about 0.01 mol %, or non-detectable by $^{119}$Sn NMR, that is, the compounds having formulas (4) and (2) are in some embodiments undetectable in a sample of the compound having formula (1).

If the content of the compounds having formula (2) is too high, it reduces the cross-linking and toughness when the material is used for EUV lithography resists. Furthermore, the compound having formula (2) can cause outgassing when the photoresists are illuminated by extreme ultraviolet radiation which can lead to degradation of the very expensive multilayer-coated optics in extreme situations. As set forth below, it is possible to reduce the dialkyl tin impurity level to as low as a level which is undetectable by $^{119}$Sn NMR by employing carefully controlled reaction and distillation conditions. However, for industrial scale reactions such as more than 0.5 kg product scale, it is often sufficient and practical to control the impurity limit to less than about 0.3 mol %, more preferably less than about 0.1 mol % based on stable production and economic consideration.

In a preferred embodiment, R' is an isopropyl group, $R^2$ is a methyl group, and the compound having formula (1) is $(iPr)Sn(NMe_2)_3$ (formula (3)), in which the dialkyl tin impurity is $(iPr)_2Sn(NMe_2)_2$. In some embodiments, when the compound has formula (3), it has a purity of at least about 99 mol % and contains no more than about 1 mol % $(iPr)_2Sn(NMe_2)_2$.

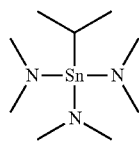

(3)

In some embodiments, the content of tetrakis(dialkylamino)tin (such as tetrakis(dimethylamino tin) in the monoalkyl tin triamide compounds having formula (1) is less than about 1 mol %. In some embodiments, the content of tetraalkyl tin in the monoalkyl tin triamide compounds having formula (1) (such as tetrakis(isopropyl)tin in $(iPr)Sn(NMe_2)_3$ as described above) is less than about 1 mol %. The contents of tetrakis(dialkylamino)tin and tetraalkyl tin (such as tetrakis(dimethylamino)tin and tetrakis(isopropyl)tin in iPrSn(NMe$_2$)$_3$) are each independently preferably less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %, less than about 0.05 mol %, less than about 0.04 mol %, less than about 0.03 mol %, less than about 0.02 mol %, less than about 0.01 mol %, or non-detectable by $^{119}$Sn NMR, that is, these compounds are undetectable in the sample of the compound having formula (1).

If the content of tetrakis(dimethylamino)tin and tetraalkyl tin are too high, defects may be caused when the material is used for EUV lithography resists due to the boiling points and molecular weights of these compounds. As set forth below, it is possible to reduce the impurity levels of these compounds to as low as a level which is undetectable by $^{119}$Sn NMR by employing carefully controlled reaction and distillation conditions. However, for industrial scale reactions such as more than 0.5 kg product scale, it may be practical to control the impurity limit to less than about 0.3 mol %, more preferably less than about 0.1 mol % based on stable production and economic consideration.

In some embodiments, a total content of $R^1Sn(NR^2{}_2)_2(N(R^2)CH_2NR^2{}_2)$, also referred to herein as compound (4) is less than about 1 mol %, and may be a compound having formula $R^ASn(NMe_2)_2(NMeCH_2NMe_2)$ or $R^B(NMe_2)_2(NMeCH_2NMe_2)$. When the compound having formula (4) is iPrSn(NMe$_2$)$_2$(NMeCH$_2$NMe$_2$) (formula (5)), it has a chemical shift in the $^{119}$Sn NMR spectrum of around −84 ppm: 119Sn NMR(223.8 MHz; C6D6): δ −84 ppm. $^1$H NMR (600 MHz; C6D6): δ 3.37 (s, 2H, CH$_2$), 2.89 (s, 3H, Sn-NMe), 2.86 (s, 12H, Sn-(NMe$_2$)$_2$), 2.15 (s, 6H, NMe$_2$), 1.68 (m, 1H, iPr), 1.33 (s, 6H, iPr).

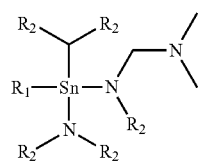

(4)

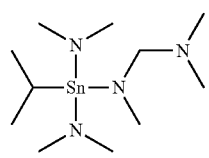

(5)

The content of the compounds having formula (4) or (5) is preferably less than about 1 mol %, less than bout 0.9 mol %, less than about 0.8 mol %, less than about 0.7 mol %, less than about 0.6 mol %, less than about 0.5 mol %, less than about 0.4 mol %, more preferably less than about 0.3 mol %, even more preferably less than about 0.2 mol %, less than about 0.1 mol %, less than about 0.05 mol %, etc.

As set forth above, it is possible to reduce the level of the compound having formula (4) or (5) to as low as less than about 0.1 mol %, such as less than about 0.05 mol %, by employing carefully controlled reaction and distillation conditions. However, for industrial scale reactions such as more than 0.5 kg product scale, it is often practical to control the impurity limit to less than about 0.3 mol %, preferably less than about 0.1 mol %, based on stable production and economic considerations.

In some embodiments, the monoalkyl tin triamide compounds having formula (1) are substantially colorless. In some embodiments, the monoalkyl tin triamide compounds having formula (1) have APHA color of less than about 20. The APHA color of a composition containing tin compounds may be controlled (such as by minimizing the formation of colored impurities) during distillation such as by using light-shielding or appropriate distillation apparatuses, as described below.

APHA color, also referred to as the Hazen or Platinum/Cobalt (Pt/Co) scale, is commonly used in the chemical industry as a yellowness index to assess the color of liquids that appear colorless to yellow in color. Measured values of yellowness (APHA color) are compared to standard solutions containing potassium hexachloro-platinate(IV), cobalt (II) chloride (Pt/Co), and hydrochloric acid in water. The APHA color scale ranges from 0 to 500, where 1 APHA color is equal to 1 ppm of Pt/Co. APHA color can be assessed through visual comparison of standards or with a spectrophotometer, as described in ASTM D1209-05 (2019).

The organometallic tin compounds having formula (1) may be used for the formation of high-resolution EUV lithography patterning precursors and are attractive due to their high purity and minimized concentrations of dialkyl impurities having formula (2), as well as additional impurities as set forth above.

Methods of Synthesis

Aspects of the disclosure additionally relate to methods for synthesizing the high purity alkyl tin compounds having formula (1) described above which are suitable for use in the microelectronic industry. These high purity compounds may be substantially free of dialkyl tin compounds having formula (2) and/or impurities having formula (4) or (5), have desired color levels, and may be prepared without multistage distillation or, in some embodiments, without any purification.

For the purposes of this disclosure, the term "high purity" may be understood to mean a purity greater than about 99 mol %, more preferably greater than about 99.1 mol %, greater than about 99.2 mol %, greater than about 99.3 mol %, greater than about 99.4 mol %, greater than about 99.5 mol %, greater than about 99.6 mol %, greater than about 99.7 mol %, greater than about 99.8 mol %, greater than about 99.9 mol %, greater than about 99.95 mol %, greater than about 99.98 mol %, greater than about 99.99 mol %, or even higher. The term "substantially free" may be understood to mean that the impurity is not detectable by $^{119}$Sn NMR, which can have detection limits as low as 0.3 mol %, 0.1 mol %, 0.05 mol %, or 0.04 mol % (depending on the particular compound or impurity) when testing the sample using specific conditions without dilution in deuterated solvent, such as by using more than 2,000 scans. In the case of specific impurities described herein, the detection limit is 0.01 mol %.

$^{119}$Sn NMR spectroscopy is ideally suited to the quantitative analysis of monoalkyl tin compounds due to its high sensitivity to small structural changes and large spectral range of 6500 ppm (see Davies et al., Eds.; *Tin Chemistry: Fundamentals, Frontiers, and Applications*; Wiley (2008)). This allows for easy identification and quantification of monoalkyl tin compounds and their impurities because $^{119}$Sn resonances are highly resolved. $^{119}$Sn NMR suffers from reduced sensitivity compared to other analytical methods such as GC, HPLC, or $^1$H NMR. To improve sensitivity, monoalkyl tin compounds are analyzed without dilution, and a large number of spectral acquisitions (at least 2000, preferably more than 10,000 for unknown impurity detection) are acquired to measure the low levels of impurities described in this work. Using this approach, detection limits of 0.01 mol % dialkyl tin diamides and other Sn compounds such as compounds having formulas (2), (4), and (5) can be achieved. In the case of $Sn(NMe_2)_4$, the detection limit is 0.3 mol % because the peak is broad.

The $^{119}$Sn NMR data described herein were obtained using a method similar to the relative purity method described in *J. Med. Chem.* (57, 22, 9220-9231 (2014)). $^{119}$Sn NMR spectra were acquired using inverse-gated $^1$H decoupling with a 45° pulse, one second relaxation delay, and sufficient scans to achieve the required sensitivity. Samples were prepared without dilution in deuterated solvent. Quantitation was performed by integrating all peaks in the spectrum and setting the total peak area to 100. Each peak in the spectrum represents a distinct tin compound and the area of each peak represents the concentration or purity of that compound in mol %.

In general, methods for preparing the monoalkyl tin triamide compounds according to aspects of the disclosure involves the following general steps, each of which is described below:

1. lithiating a solution of dimethylamine and a first solvent to produce lithium dimethylamide;
2. adding a solution containing an alkyl trichlorotin and a second solvent to the lithium dimethylamide solution with stirring;
3. removing the LiCl salt product by filtration;
4. removing the solvents under vacuum to produce a crude product; and optionally
5. distilling the crude product, to yield a product containing at least about 99 mol % monoalkyl tin triamide.

As previously explained, the reaction conditions and parameters such as solvent, relative amounts of reactants, stirring conditions, temperature, and concentrations should be carefully controlled to ensure the production of the desired compound in high purity.

Solvent

The first and second solvents are not particularly limited, but preferred solvents include hydrocarbons (such as, but not limited to, hexane, hexanes, heptane, and cyclohexane), aromatics (such as, but not limited to, toluene and xylene), and ethers (such as, but not limited to, THF and $Et_2O$), and mixtures thereof. Particularly presently preferred are hydrocarbons and aromatics as the main component of the solvent for removing LiCl by filtration. Toluene and hexane are presently the most preferred solvents for easy removal of the product under vacuum at low temperature following the reaction. Additionally, ethers, such as the most preferred THF, are presently preferred solvents because of the high solubility of lithium dimethylamide in these types of solvents. It is also within the scope of the disclosure to use mixtures of these solvents. In some embodiments, the solvent used for the lithiation step and the solvent used for the amination step are the same.

Amount of Lithium Dimethylamide

The preferred amount of lithium dimethylamide relative to the alkyl trichlorotin is greater than about 3.0 equivalents, greater than about 3.05 equivalents, greater than about 3.09 equivalents, greater than about 3.10 equivalents, or greater than about 3.15 equivalents. If the amount of lithium dimethylamide is too low, the reaction speed will be too low and the amount of impurities will increase due to side reactions such as redistribution.

Stirring Conditions during Addition of Alkyl Trichlorotin

The stirring speed during the addition of the alkyl trichlorotin is significant in determining the purity of the resulting product. A solution of lithium amide in hexane or toluene is in fact a heavy slurry, so stirring at a high speed is preferable for sufficient mixing. On the other hand, stirring at too high a speed can cause problems with the motor due to the heavy slurry. The preferred stirring speed is more than about 10 rpm, more than about 20 rpm, more than about 40 rpm, more preferably more than about 60 rpm and most preferably more than about 100 rpm. On the other hand, the preferred stirring speed is less than about 500 rpm, less than about 400 rpm, less than about 300 rpm, more preferably less than about 250 rpm and most preferably less than about 200 rpm. To achieve good mixing, the selection of a suitable shape and size of the stirring blade is important. For example, appropriate stirring blades include paddle blades, anchor blades, Twinstir blades, ribbon blades, 3-blade retreat impellers, and log bone blades. In the reaction between the lithium amide slurry and the alkyl trichlorotin (amination), it is important to have high blade peripheral speed because miniaturization and lithium amide slurry and high reactivity are high shear stress achieved in blade peripheral speed (blade tip speed, m/s). The preferred blade peripheral speed is about 0.1 rpm or more, preferably 0.3 rpm or more, most preferably 0.5 rpm or more and 1000 rpm or less, preferably 100 rpm or less, most preferably 50 rpm or less. The blade peripheral speed is calculated by the following formula (a):

$$\text{Blade peripheral speed(m/s)} = \pi \times D \times N/60 \quad (a)$$

In formula (a), D represents blade diameter (m) and N represents the number of rotations (rpm).

Temperatures

For the lithiation step, the lower preferred temperature is about −78° C., about −40° C., about −20° C., about −10° C., or the most preferred lower temperature of about 0° C., and the upper limit of the temperature is about 40° C., about 20° C., or the most preferred upper limit of about 10° C. Thus, the preferred temperature range is about 0° C. to about 10° C. If the reaction temperature for the lithiation is too low, the reaction viscosity may be too high. Conversely, if the reaction temperature is too high, the HNMe$_2$ will evaporate.

For the step of adding the alkyl trichlorotin (amination), the lower preferred temperatures are about −78° C., about −40° C., about −20° C., about −10° C., most preferably about 0° C. and the upper limit of the temperature is about 40° C., about 25° C., about 20° C., or the most preferred upper limit of about 10° C. Thus, the preferred temperature range is about 0° C. to about 10° C. In other embodiments, however, the reaction is preferably performed at room temperature. If the temperature is too low, the reaction rate will be too slow, whereas if the temperature is too high, byproducts will be produced.

Lithium Dimethylamide Concentration

The lithium dimethylamine is presently present in the solution in an amount of up to about 30 wt %, more preferably up to about 20 wt %, up to about 15 wt %, or up to about 10 wt %. It has been found that this dilute concentration provides an effective slurry for solid and liquid reactions. On the other hand, the productivity is lower in dilute condition in industrial conditions.

A method for preparing a monoalkyl tin triamide compound having formula (1a)

$$R^1Sn(NR^2{}_2)_3 \quad (1a)$$

according to aspects of the disclosure involves the following steps, each of which is described in further detail below:

(a) lithiating a solution comprising a dimethylamine and a first solvent to produce a lithium dimethylamide solution having a concentration of up to about 10 wt %;
(b) adding a solution comprising an alkyl trichlorotin and a second solvent; wherein the amount of lithium dimethylamide in the solution is at least about 3.09 equivalents relative to the amount of alkyl trichlorotin;
(c) removing the LiCl salt product by filtration; and
(d) removing the first solvent and the second solvent under vacuum to produce a crude product containing the monoalkyl tin triamide having formula (1a).

In formula (1a), $R^1$ is selected from $R^A$ and $R^B$; $R^A$ is a primary alkyl group having about 1 to 10 carbon atoms and R B is a secondary alkyl group having about 3 to 10 carbon atoms; and each $R^2$ is independently an alkyl group having about 1 to 10 carbon atoms.

It is preferred if the method steps (a) to (d) are performed substantially without light exposure, such as performing at least steps (a) and (b) in an amber or stainless-steel reactor. Light exposure, as explained below, has detrimental effects on the monoalkyl tin triamide compounds.

In some embodiments, the first solvent and the second solvent are the same.

The first step in the method involves lithiating dimethylamine in a solution of a first solvent such as hexanes in an amount of up to (but not greater than) 10 wt %. It has been found that this dilute concentration provides an effective slurry for solid and liquid reactions. The lithiation is performed at a preferred temperature of about −10° C. to about 10° C., and at about 0° C. to about 10° C. in some embodiments. The lithiation may be performed with n-BuLi or other common lithiating reagents commonly used in the art, such as t-BuLi or HexylLi. Such lithiating agents are commonly employed in a hexanes solution and additional hexanes may be added so that the lithium dimethylamide is present in the desired concentration range. Excess dimethylamine is required to ensure that the lithiating reagent is fully reacted. The reaction is performed under an inert atmosphere, such as nitrogen or argon, and the addition rate is controlled to limit the exothermic reaction. Following the completion of the addition, the reaction mixture is warmed to room temperature to vaporize the butane byproduct and excess dimethylamine, then cooled to about −10° C. to about 10° C., or to at about 0° C. to about 10° C. in some embodiments.

In the second method step, an alkyl trichlorotin solution in a second solvent such as toluene is added to the reaction mixture which is maintained at a preferred temperature of about −10° C. to about 10° C., or at about 0° C. to about 10° C. in some embodiments. The alkyl trichlorotin is added such that the amount of lithium dimethyl amide is in an amount of at least about 3.09 equivalents relative to the amount of alkyl trichlorotin. The alkyl trichlorotin solution is preferably added in a dropwise fashion to control the exothermic reaction. The second method step is preferably performed in an inert atmosphere, such as nitrogen or argon.

After completing the addition of alkyl trichlorotin to the reaction mixture, the reaction mixture is allowed to slowly warm to room temperature, such as over a period of about four hours, and then stirred for an additional time period at room temperature, such as for about four hours. The reaction mixture is then filtered, such as through sparkler, to remove the LiCl byproduct. Other means of filtration which are known in the art may also be employed. The resulting salt is then rinsed, such as with anhydrous hexanes, and the solvents (such as hexanes and toluene) are removed under reduced pressure by means known in the art to produce a crude product containing at least about 85 mol % monoalkyl tin triamide.

Finally, in some embodiments, the crude product having formula (1a) is distilled such as at about 1 torr, such as by using a 300 mm Pro-Pak column, discarding any distillate before the boiling point of the monoalkyl tin triamide, and collecting only the distillate obtained at the boiling point of the monoalkyl tin triamide to yield a product containing at least about 99 mol % monoalkyl tin triamide having formula (1a). The boiling points of two representative monoalkyl tin triamides are shown in Table 1. As an example, if the desired product is methyl tin triamide, distillates obtained at lower than 34° C. are discarded, and only distillates obtained at 34-35° C. are collected.

TABLE 1

Boiling Points of Representative
Monoalkyl Tin Triamide Compounds

| Compound | B.p.(° C.) |
|---|---|
| MeSn(NMe$_2$)$_3$ | 34-35/1 torr |
| EtSn(NMe$_2$)$_3$ | 38.0-38.5/0.6 torr |

The distillate obtained at the boiling point, such as 34-35° C. for methyl tin triamide, contains the monoalkyl tin triamide compound having a purity of at least about 99 mol %. For example, when the desired compound having formula (1a) is methyl tin triamide, the $^{119}$Sn NMR (neat) spectrum showing peaks at δ −16.78 (99.5%) and δ 56.23 (0.5%) agrees with published data for methyl tin triamide and dimethyl tin diamide, respectively.

Following distillation, the compound having formula (1a) contains less than about 1 mol % R$^1$Sn(NR$^2$$_2$)$_2$(N(R$^2$)CH$_2$NR$^2$$_2$) or less than about 0.05 mol % R$^1$Sn(NR$^2$$_2$)$_2$(N(R$^2$)CH$_2$NR$^2$$_2$).

A further aspect of the disclosure relates to a method of synthesizing a monoalkyl tin triamide compound having formula (1) and having a purity of at least about 85 mol %:

R$^1$Sn(NR$^2$$_2$)$_3$      (1)

wherein R$^1$ is selected from R$^A$, and R$^B$,
R$^A$ is a primary alkyl group having about 1 to 10 carbon atoms, and R$^B$ is a secondary alkyl group having about 3 to 10 carbon atoms, and
each R$^2$ is independently an alkyl group having about 1 to 10 carbon atoms; the method comprising:
(a) lithiating a solution comprising a dimethylamine and a first solvent to produce a lithium dimethylamide solution having a concentration of up to about 10 wt %;
(b) adding a solution comprising an alkyl trichlorotin and a second solvent; wherein the amount of lithium dimethylamide in the solution is at least about 3.09 equivalents relative to the amount of alkyl trichlorotin;
(c) removing the LiCl salt product by filtration; and
(d) removing the first solvent and the second solvent under vacuum to produce a crude product containing the monoalkyl tin triamide having formula (1), wherein first solvent is the same as the second solvent; and distilling the compound having formula (1).

One method for preparing an isopropyl tin triamide compound having formula (3) according to aspects of the disclosure involves the following steps:
(a) lithiating a dimethylamine in a solution of hexanes at about 0° C. to 10° C. to produce lithium dimethylamide having a concentration in the hexanes of up to about 10 wt %;

(b) adding an isopropyl trichlorotin solution in toluene at about 0 to 10° C.; wherein the amount of lithium dimethylamide in the solution is at least about 3.09 equivalents relative to the amount of isopropyl trichlorotin;
(c) removing the LiCl salt product by filtration; and
(d) removing the hexanes and toluene under vacuum to produce a product containing at least about 99 mol % isopropyl tin triamide having formula (3).

A second method for preparing an isopropyl tin triamide compound having formula (3) according to aspects of the disclosure involves the following steps:
(a) lithiating a dimethylamine in a solution of THF at about 0° C. to 10° C. to produce lithium dimethylamide;
(b) adding an isopropyl trichlorotin solution in toluene at about 0 to 10° C.; wherein the amount of lithium dimethylamide in the solution is at least about 3.09 equivalents relative to the amount of isopropyl trichlorotin;
(c) removing the LiCl salt product by filtration; and
(d) removing the THF and toluene under vacuum to produce a product containing at least about 99 mol % isopropyl tin triamide having formula (3).

The processes for producing the isopropyl tin triamide compound having formula (3) are the same as that described above for producing a monoalkyl tin triamide compound having formula (1) except that no distillation step may be is required, that is, the product obtained after step (b) is already at least about 99 mol % pure. The methods described above for synthesizing the isopropyl tin triamide compound having formula (3) may also be employed to synthesize other alkyl tin triamide compounds having formula (1) with only the alkyl trichlorotin reactant varied.

Isopropyl tin triamide produced by the methods according to the disclosure are substantially colorless liquids with $^{119}$Sn NMR (neat) spectra showing peaks at δ −64.85 (99.8%) and δ −19.06 ppm (0.2%), agreeing with published and collected data for isopropyl tin triamide and diisopropyl tin diamide respectfully. However, if desired, the product may be further distilled to remove any undesired organic impurities and/or byproducts, as well as to isolate any photo decomposed byproduct. It has been found that, contrary to literature reports of collecting distillation product at 50-52° C. at 1.4 mTorr, the product obtained at 49-53° C. and 0.5 torr has desired high purity and is desirably colorless.

While performing the amination reaction to form monoalkyl tin triamides, the Kocheshkov-like comproportionation shown in scheme (I) above also occurs, and even low temperature, such as from about −78° C. to 10° C., does not prevent the comproportionation reaction from occurring. Instead, the low temperature has been found to slow the substitution reaction, which increases the risk of comproportionation Further, light or heat can accelerate the comproportionation and form up to 15 mol % dialkyl tin amides as determined by $^{119}$Sn NMR. According to the method reported by Lorberth, the amination reaction is performed as a solid slurry in hexanes and is a liquid reaction.

The methods described herein solve the known problems in several ways. First, it has been found as described herein that to prevent comproportionation from occurring during the reaction, the lithium dimethylamide must be prepared properly. Second, the concentration of reactants is diluted, such as by employing lithium dimethylamide in a hexane slurry at a concentration of not more than about 10 wt %. Third, comproportionation may be minimized by performing the reaction at preferred temperatures of around −10° C.

to 10° C. or about 0° C. to about 10° C. rather than at a lower temperature. Finally, THF may be employed instead of hexanes to form a homogeneous solution of lithium dimethylamide. Using the methods described herein, iPrSn(NMe$_2$)$_3$ can be produced at very high purity (containing no more than about 0.05 mol % dialkyl tin compounds and other specified impurities) without purification in a pilot scale.

Purification

Further aspects of the disclosure additionally relate to methods of purifying monoalkyl tin triamide compounds having formula (1) described above.

Methods of purification encompassed by the disclosure include:

single-stage flash to remove metal contamination;
fractional distillation to remove di-alkyl tin impurities as a heavy fraction;
fractional distillation to remove tetra-alkyl tin impurities as a light fraction;
using fractional distillation to remove di- and tetra-alkyl tin impurities simultaneously in either a batch or a continuous mode;
using microchannel distillation to remove close boiling di-alkyl and tetra-alkyl impurities;
fractional distillation to remove metal contaminants simultaneously with di- and tetra-alkyl tin impurities;
use of light-impervious materials to prevent the formation of photo decomposition products of organotin compounds;
distillation in which the bottoms temperature is limited (such as to less than 112° C.) to limit the formation and tetra-alkyl tin compounds;
running a condenser at or near the dew point of the overhead product to increase operating efficiency;
processing the heel from an initial distillation process, with a concentrated di-alkyl tin impurity, though the same or a different purification process to recover more of the desired isopropyl trimethylamine tin product and/or a purified di-alkyl tin product;
re-equilibrating the di- and tetra-alkyl byproducts to generate the desired isopropyl trimethylamine tin product;
recycling the heel from the initial distillation process through the last step of the manufacturing process to take advantage of the equilibrium disproportionation of the desired product into di-alkyl and tetra-alkyl tin impurities;
maintaining a minimum di-alkyl tin impurity level in the feed to the distillation to take advantage of the same equilibrium disproportionation;
using adsorbents or ion exchange resins to reduce metallic impurities, chloride impurities, water, and oxygen; and/or
using adsorbents to reduce color without introducing isopropyl trimethylamine tin decomposition products.

The size of the alkyl group (and its similarity in size with the NMe$_2$ group) can affect the boiling point differences between monoalkyl tin triamides and dialkyl tin diamides, and fractional distillation is typically the superior method to isolate the contaminants. As an example, the difference between the molecular weights of $^i$PrSn(NMe$_2$)$_3$ (A) and $^i$Pr$_2$Sn(NMe$_2$)$_2$ (B) is small (294 g/mol and 293 g/mol, respectively). For the t-butyl compounds, the triamido tin compound is lighter than the diamido tin analog by only 13 g/mol. Considering the isopropyl analog, with a difference of only 1 g/mol and very similar polarity between the isopropyl and dimethylamino group, the difference in the boiling points of compounds A and B can be extremely small. The boiling points of these two compounds having purities of >97 mol % were measured over a wide range of pressures, as shown in FIG. 1. It may be seen that the boiling point difference between the two compounds is within 2° C. in the pressure range of 0.7-10 torr. In another example, the boiling points of $^t$BuSn(NMe$_2$)$_3$ and $^t$Bu$_2$Sn(NMe$_2$)$_2$ at 0.4 torr are 50° C. (measured) and 90° C. (reported in *Chemische Berichte*, 112(8), 2798-803 (1979)), respectively.

Accordingly, purification by fractional distillation is challenging and requires specific distillation parameters which have been specifically developed. Employing such purification methods can provide $^i$PrSn(NMe$_2$)$_3$ or analogs with <0.5 mol % dialkyl, <0.4 mol % dialkyl, <0.3 mol % dialkyl, <0.2 mol % dialkyl, <0.1 mol % dialkyl, <0.05 mol % dialkyl, or no detectable dialkyl tin compound contamination as explained below.

When the difference in mass between the alkyl group and the amido group is large, (for example, the tBu-NMe$_2$ pair has a difference of 13 amu), purification by fractional distillation is expected to be less difficult. When the difference is small, the purification is expected to be more difficult. For example, the iPr-NMe$_2$ pair has a difference of −1 amu (i.e., the iPr group is slightly lighter than the amido group). In other examples, the cyclohexyl—NMe2 pair has a molecular weight difference of 39 amu and the cycloheptyl—NMe$_2$ pair has a molecular weight difference of 53 amu. Schwarzenbach et al. (*Environmental Organic Chemistry;* 56-75 (1993)) observes that increasing component molecular weight retards the vapor pressure over a range of molecular weights for an analogous series of compounds. Essentially, a compound having more electrons has stronger London forces. However, this does not address the non-ideal behavior often observed in multicomponent vapor liquid equilibrium.

A further aspect of the disclosure relates to a method of using fractional distillation to purify $^1$PrSn(NMe$_2$)$_3$ having an initial purity of at least about 85 mol %, and even a purity of at least about 97 mol % or at least about 99 mol %. The method comprises performing a fractional distillation using an operating pressure of about 0.1 to about 50 torr (such as greater than about 0.1 torr, greater than about 0.2 torr, greater than about 0.3 torr, preferably greater than about 0.5 torr, more preferably greater than about 1 torr, preferably less than about 50 torr, less than about 30 torr, less than about 20 torr, less than about 10 torr, most preferably about 1 torr). If the pressure is too high, the formation of decomposition and redistribution products is accelerated. If the pressure is too low, volatilization speed is too high and separation efficiency through the distillation column is too low.

The fractional distillation preferably employs a pot temperature of about 50° C. to about 120° C. (preferably greater than about 50° C., greater than about 60° C., preferably greater than about 70° C., preferably greater than about 80° C., preferably greater than about 90° C., preferably greater than about 100° C., most preferably greater than about 105° C. and preferably less than about 120° C., preferably less than about 115° C., most preferably about 110° C.). If the pot temperature is too low, the volatilization speed is too low and the distillation time is too long. Conversely, if the pot temperature is too high, decomposition of the product is accelerated.

The fraction distillation preferably employs a condenser temperature within about 10° C., more preferably within about 7° C., more preferably within about 5° C., more preferably within about 3° C., most preferably within about 1° C. of the dew point of the desired compound having formula (1) such as iPrSn(NMe$_2$)$_3$ at the employed operating pressure and a reflux ratio of about 10 to 100 (preferably about 20 to 80, more preferably about 40 to 60, more preferably about 50), thereby obtaining a sample of iPrSn (NMe$_2$)$_3$ having a purity of greater than about 99.5 mol %. In one embodiment, the purified sample of iPrSn(NMe$_2$)$_3$ contains less than about 0.1 mol % (iPr)$_2$Sn(NMe$_2$)$_2$ as determined by known analytical methods, such as GC and HPLC or is even undetectable by $^{119}$Sn NMR.

Thus, one method of purification of $^i$PrSn(NMe$_2$)$_3$ according to the disclosure employs fractional distillation using a pot temperature below about 112° C. to avoid the formation of the tetramethylamido tin compound Sn(NMe$_2$)$_4$ and the removal of substantial amounts of the dialkyl tin compound (iPr)$_2$Sn(NMe$_2$)$_2$.

For example, the following conditions may be employed in the fractional distillation purification method of $^i$PrSn (NMe$_2$)$_3$ according to aspects of the disclosure: 10 torr pressure, 105° C. pot temperature, 95° C. condenser temperature, and a reflux ratio of 50. Starting with a feed purity of 97% $^i$PrSn(NMe$_2$)$_3$, fractional distillation using these parameters produces a cut of 99.5% with a corresponding 95.7% in the bottoms product after removing 46 g from an initial charge of 8.6 kg. Purity is determined using $^{119}$Sn NMR without diluting the sample with deuterated solvent.

Monoalkyl tin triamide compounds can undergo disproportionation to the dialkyl tin diamide and the tetraamide compounds. The degree of disproportionation is affected by the temperature in the distillation pot, with higher temperatures expected to lead to higher degrees of disproportionation. The disproportion activation energy is related to the size of the alkyl group (R). For example, when R is a methyl group, disproportion can be observed around 45° C. As another example, when R is an isopropyl group, the disproportionation occurs around 110° C. Disproportion of the tert-butyl group occurs at higher temperatures. The two impurities resulting from disproportionating the mono-alkyl tin tri-amide compounds differ in molecular weight from the starting mono-alkyl compound in accordance with the difference between the masses of the alkyl and amido groups. One product will be heavier than the starting mono-alkyl tin tri-amide and the other product will be lighter than the mono-alkyl tin tri-amide. Consequently, the lighter compound is expected to appear in the distillate fraction and the heavier compound to appear in the bottom fraction from the distillation, guaranteeing both a light and a heavy impurity and making the distillation more difficult. Thus, it has been found that limiting the pot temperature, and thus the degree of disproportionation, not only improves the yield by limiting loss of the desired mono-alkyl product, but also avoids the generation of additional impurity to be removed. As is well known in the art, determining the optimal conditions for separating similar components using distillation is not straightforward or predictable, and requires significant analysis and experimentation of the various inter-related parameters.

Light Sensitivity

It has been found that monoalkyl tin triamide compounds are light sensitive, so that proper light protection is necessary during reaction and purification. Freshly prepared iPrSn (NMe$_2$)$_3$ is a colorless liquid. However, when an NMR sample of iPrSn(NMe$_2$)$_3$ is allowed to sit in the lab under normal room lighting, the sample turns yellow. This change in color is highlighted by the shelf-life data shown in FIG. 2. After exposure to light, there is a new $^{119}$Sn resonance at −84 ppm which indicates the formation of a light-induced decomposition by-product, the compound having formula (5), iPrSn(NMe$_2$)$_2$(NMeCH$_2$NMe$_2$). The $^{119}$Sn NMR depicting the formation of the compound having formula (5) is shown in FIG. 3. The rate of photodecomposition is increased with increasing temperature. Accordingly, maintaining the purified samples of iPrSn(NMe$_2$)$_3$ in the dark (without light exposure) minimizes the formation of undesirable light-induced decomposition byproducts and making it possible to provide (iPr)Sn(NMe$_2$)$_3$ in which a total content of substances having a chemical shift in the $^{119}$Sn NMR spectrum of around −84 ppm in is less than 1% by mass. Light control during the reaction steps to produce the monoalkyl tin triamide compounds is also important and may be accomplished by employing amber or stainless-steel reactors or glass reactors which are shielded from light.

Similarly, the distillation may be performed using a stainless steel column packed with a stainless steel packing material. Alternatively, the distillation may be performed in a light-shielded apparatus comprising glass such as glass equipment, glass-lined equipment, glass-coated equipment, etc. Shielding may be accomplished by any method known in the art such as, for example, employing light-shielded containers such as amber glass, metal (SUS) containers, wrapping the container with a light-shielding cover such as cloth, foil or film, using light-shielding coatings, or performing the distillation in a dark room.

Storage

A method of storing a sample (such as, but not limited to a sample of more than about 0.5 kg) of a monoalkyl tin triamide compound having formula (1) and having a purity of at least about 99 mol % comprises storing the sample of the monoalkyltin triamide compound having formula (1) substantially without light exposure and at a temperature of less than about 30° C.

The sample of the compound having formula (1) may have a content of R$^1$Sn(NR$_2$$^2$)$_2$(N(R$^2$)CH$_2$NR$^2$$_2$) of less than about 1 mol % or less than about 0.05 mol %.

The sample of the monoalkyl tin triamide compound having formula (1) may be stored for about three days to about one year, such as about a week or longer, not more than about ten months, a period of about two to six weeks, and all intermediate times as desired. Preferably the sample is stored at a temperature of less than about 30° C., less than about 25° C., less than about 20° C., and preferably greater than about −10° C. "Substantively without light exposure" may be understood to mean that the sample is protected from light exposure to the greatest possible extent, such as by storage in an amber or stainless steel vessel. In embodiments, the sample of the monoalkyltin triamide undergoes substantively no decomposition after a storage time of about three days to about one year as described above.

Reduction of Additional Impurities

It is reasonable to presume that metallic impurities in alkyl tin triamide compounds are present as metal chlorides. If so, removal may be affected over an adsorbent, such as BASF CL-750, a chloride adsorbent known in the industry. Additional chloride impurities may be present, such as amine hydrochlorides and lithium chlorides which may be carried forward in the production process and become impurities of concern. Removal over a chloride-scavenging adsorbent, e.g., CL-750, activated carbon, or activated alumina, may be effective for removal. Finally, the desired tin compounds may contain water and oxygen impurities. Carbons promoted with metal halides and then activated have been used to remove water and oxygen from HCl gas, and a similar approach may be effective.

The invention will now be described in connection with the following, non-limiting examples.

Example 1: Column Design and General Operations

The following distillation parameters were employed in the Examples which follow:

a. Glass-lined steel sump, nominal 16 liters
b. 2" Schedule-40 316-SS heated column
c. 0.24" 316 L SS ProPak packing, 5 ft total column length
d. Off/On reflux splitter operating at apparent reflux ratios between 33 and 50
e. Stainless steel shell-and-tube condenser operated as a total condenser
f. 304SS receiver vessel
g. 316SS product vessel

Example 2: Demonstration of Purification of (iPr)Sn(NMe$_2$)$_3$ by Distillation A sample of (iPr)Sn(NMe$_2$)$_3$ having a purity of 97% was used as the feed, with a reflux ratio of 50, operating pressure of 10 Torr, pot temp 105-105.2° C., and condenser temperature of 95° C. The product fraction purity was 99.5% and two inline distillate samples had purities of 99.8% and 99.7% (iPr)Sn(NMe$_2$)$_3$ using $^{119}$Sn NMR without diluting the sample with deuterated solvent.

Example 3: Effect of Condenser Temperature on Fractionation of (iPr)Sn(NMe$_2$)$_3$ Three distillation runs of (iPr)Sn(NMe$_2$)$_3$ were performed with fractionating efficiency characterized using the Fenske equation (alpha^N) calculated analytically from samples collected from the pot and the receiver after running a period of time (2 to 8 hours). The reflux ratio was 50 and the pressure was 10 Torr. The results are tabulated below in Table 2 and demonstrate that the condenser temperature has a significant effect on the overall performance of the distillation, as evaluated by higher fractionating efficiency. The dew point of iPrSn(NMe$_2$)$_3$ is observed to be 96° C. Thus, operating the condenser at close approach to the dew point of the product stream is advantageous to effecting separation and maximizing the efficiency of the column.

TABLE 2

Distillation Conditions of Example 3

| Run | Pot Jkt Temp (C.) | Cndsr Temp (C.) | Fractionating Efficiency |
|---|---|---|---|
| 1 | 110 | 95 | 8.34 |
| 2 | 105 | 90 | 3.62 |
| 3 | 120 | 90 | 3.38 |

Example 4: Effect of Pot Temperature on Tetra-alkyl Sn(NMe$_2$)$_4$ Impurity Formation The tetra-amido Sn(NMe$_2$)$_4$ impurity (6) is formed from the disproportionation of (iPr)Sn(NMe$_2$)$_3$, co-producing the already present di-alkyl (iPr)$_2$Sn(NMe$_2$)$_2$ impurity (7). The effect becomes noticeable as the pot temperature increases from 110° C. to 115° C.

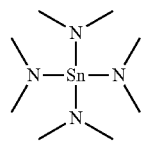

(6)

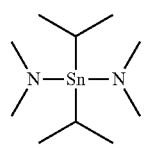

(7)

The tetra-amido impurity (FW=295.0) is a light component in the distillation, and thus appears in the distillate. Conversely, the di-alkyl impurity (FW=293) is a heavy component and appears in the bottoms product. This is counterintuitive based on the (admittedly slight) differences in formula weight. (iPr)Sn(NMe$_2$)$_3$ has a FW of 294.0. With both a light and a heavy impurity, the desired (iPr)Sn(NMe$_2$)$_3$ compound becomes a middle product. A batch distillation process would then require a forecut to remove the tetra-impurity. Continuous distillation would require two columns to recover the (iPr)Sn(NMe$_2$)$_3$.

The following conditions were employed:

a. Condenser temp=90° C.
b. Reflux ratio=40 to 50
c. Pressure=10 Torr
d. Pot temp=111.1 to 111.9° C.

Compositions measured in the system as shown in the following Tables 3 and 4 show the effect of increasing pot temperature on the degree of purification achieved. In Tables 3 and 4, the tin compounds (3), (6), and (7) have the structures shown above.

At 110° C. there was no tetra-amido tin (6) observed in the receiver nor in the samples collected from the reflux back to the column. At higher pot temperatures, the amount of tetra-amido tin in the receiver and reflux samples increased. None of the pot samples showed any tetra-amido tin, indicating that this compound is a light key, even though it is slightly heavier (by 1 amu) than the iPrSn(NMe$_2$)$_3$.

TABLE 3

Distillation Results of Example 4

| Pot Temp (° C.) | Pot Composition (mol %) | | | Receiver Composition (mol %) | | | Reflux Composition (mol %) | | |
|---|---|---|---|---|---|---|---|---|---|
| | 6 | 3 | 7 | 6 | 3 | 7 | 6 | 3 | 7 |
| 110 | 4.5 | 95.5 | N.D. | 1.1 | 98.9 | N.D. | 0.5 | 99.5 | N.D. |
| 112 | 3.6 | 96.4 | N.D. | 0.4 | 99.0 | N.D. | 0.0 | 98.9 | 1.1 |
| 115 | 4.2 | 95.8 | N.D. | 0.1 | 98.6 | 1.3 | 0.2 | 98.2 | 1.6 |

N.D.: Not detected by $^{119}$Sn NMR

TABLE 4

Distillation Results Example 4

| Compound | 6 | 3 | 7 |
|---|---|---|---|
| Mol weight | 293 | 294 | 295 |
| Mol % by NMR | | | |
| Pot | 3.6 | 96.4 | N.D. |
| Return 1 | N.D. | 98.8 | 1.2 |
| Return 2 | N.D. | 99.1 | 0.9 |
| Receiver | 0.4 | 99.0 | 0.6 |

N.D.; Not detected by $^{119}$Sn NMR

Example 5: Synthesis of Methyl Tris(dimethylamino)tin

Anhydrous hexanes (970.5 g, 11.26 mol) and n-BuLi (429.8 g, 1.61 mol, 2.4 M solution in hexanes) were charged into a 5 L reactor. Dimethylamine (145.1 g, 3.22 mol) was added subsurface at about 0~10° C. The reaction mixture was stirred for an additional four hours while warming to room temperature before methyl trichloro tin (125.0 g, 0.52 mol) in toluene (125 g, 1.36 mol) was added dropwise at about 0~10° C. The resulting mixture was allowed to warm to room temperature over four hours and stirred for an additional four hours at room temperature. The reaction mixture was filtered through sparkler to remove the LiCl byproduct. The salt was rinsed with anhydrous hexanes (2×100 mL). The solvent was removed under reduced pressure, and the residue was distilled under reduced pressure (34-35° C., 1 torr) with a 316 SS Pro-Pak column equipped with an amber distill head. The product was collected in an amber glass receiver as a clear colorless liquid. Yield: 74.0 g (53.4%), $^{119}$Sn NMR (149.2 MHz; neat): δ −16.78. $^1$H NMR (400 MHz; C$_6$D$_6$): δ 2.79 (s, 18H, NCH$_3$), δ 0.12 (s, 3H, CH$_3$). Purity ($^{119}$Sn NMR): 99.5% product, 0.5% dimethyltin diamide. The $^{119}$Sn and $^1$H NMR spectra are shown in FIGS. 4 and 5.

Example 6: Synthesis of Isopropyl Tris(dimethylamino)tin

Anhydrous hexanes (6.3 kg, 73 mol) and n-BuLi (3.1 kg, 11.75 mol, 2.4 M solution in hexanes) were charged into a 22 L 316 stainless steel reactor equipped with a banana-shaped blade (CG-16). Dimethylamine (1.1 kg, 23.5 mol) was added subsurface at about 0-10° C. with stirring at about 200 rpm. The reaction mixture was stirred for an additional four hours while warming to room temperature before isopropyl trichloro tin (1.0 kg, 3.73 mol) was added dropwise at about 0-10° C. The resulting mixture was allowed to warm to room temperature over four hours and stirred for an additional four hours at room temperature. The reaction mixture was filtered through sparkler to remove the LiCl byproduct. The salt was rinsed with anhydrous hexanes (2×500 mL). The solvent was removed under reduced pressure. In order to further purify the product, the residue was distilled under reduced pressure (49-53° C., 0.5 torr) with a 316 SS Pro-Pak column equipped with an amber distill head. The product was collected in an amber glass receiver as a clear colorless liquid. Yield: 803 g (73.3%). $^{119}$Sn NMR (149.2 MHz; neat): δ −64.85. $^1$H NMR (400 MHz; C$_6$D$_6$): δ 2.85 (s, 18H, NCH$_3$), δ 1.61 (m, 1H, methine), δ 1.27 (d, 6H, CH$_3$). Purity ($^{119}$Sn NMR): 99.8% product, 0.2% diisopropyltin diamide (7), 0.0% compound (5) ($^{119}$Sn NMR (149.2 MHz; neat): δ −84 ppm). The $^{119}$Sn and $^1$H NMR spectra are shown in FIGS. 6 and 7. The product was stored in a 316 SS ampoule without light exposure at 25° C.

Example 7: Synthesis of Isopropyl Tris(dimethylamino)tin

Anhydrous THF (1.0 kg, 13.86 mol) and n-BuLi (1.2 kg, 4.61 mol, 2.4 M solution in hexanes) were charged into an amber glass reactor. Dimethylamine (0.38 kg, 8.32 mol) was added subsurface at about 0~10° C. The reaction mixture was stirred for an additional four hours while warming to room temperature before isopropyl trichloro tin (0.4 kg, 1.49 mol) was added dropwise at about 0-10° C. The resulting mixture was allowed to warm to room temperature over four hours and stirred for an additional four hours at room temperature. The reaction mixture was filtered through sparkler to remove the LiCl byproduct. The salt was rinsed with anhydrous hexanes (2×200 mL). The solvent was removed under reduced pressure. In order to further purify the product, the residue was distilled under reduced pressure (49-53° C., 0.5 torr) with a 316 SS Pro-Pak column equipped with an amber distill head. The product was collected in an amber glass receiver as a clear colorless liquid. Yield: 305 g (69.5%). $^{119}$Sn NMR (149.2 MHz; neat): δ −64.85. $^1$H NMR (400 MHz; C$_6$D$_6$): δ 2.85 (s. 18H, NCH$_3$), δ 1.61 (m, 1H, methine), δ 1.27 (d, 6H, CH$_3$). Purity ($^{119}$Sn NMR): 99.57% product, 0.43% diisopropyltin diamide. The $^{119}$Sn NMR spectrum is shown in FIG. 8.

Example 8: Effect of Temperature on Synthesis of Isopropyl Tris(dimethylamino)tin In three parallel experiments, anhydrous hexanes (217.1 g, 2.52 mol) and n-BuLi (186.6 g, 0.63 mol, 2.4 M solution in hexanes) were charged into a 5 L reactor. Dimethylamine (56.8 g, 1.26 mol) was added subsurface at about 0~10° C. The reaction mixture was stirred for an additional four hours while warming to room temperature before isopropyl trichloro tin (53.6 g, 0.2 mol) was added dropwise at about −78° C., about −40° C., or about 0° C. The resulting mixture was allowed to warm to room temperature over four hours and stirred for an additional four hours at room temperature. The reaction mixture was filtered through sparkler to remove the LiCl byproduct. The salt was rinsed with anhydrous hexanes (2×100 mL). The solvent was removed under reduced pressure. The relative amounts of the desired product (3) and the biproduct (7) are shown in Table 5 and the $^{119}$Sn NMR spectra for the reactions at about 0° C., about −40° C., and about −78° C. shown in FIGS. 9, 10, and 11, respectively. It may be seen that the highest purities were obtained at about −78° C. and about 0° C. and that the lowest purity was obtained at about −40° C. Further, from among the three temperatures studied, the ideal temperature for the reaction is about 0° C.

TABLE 5

Temperature Controlled Reaction Results

| Pot Comp (mol %) | 0° C. | −40° C. | −78° C. |
|---|---|---|---|
| 7 | 0.87 | 2.03 | 1.08 |
| 3 | 99.13 | 97.97 | 98.92 |

Example 9: Effect of Photodecomposition on Synthesis of Isopropyl Tris(dimethylamino)tin Anhydrous hexanes (120.6 g, 1.40 mol) and n-BuLi (127 ml, 0.35 mol, 186.6 g, 2.76 M solution in hexanes) were charged into a 5 L glass reactor with no shade to protect from light. Dimethylamine (48 ml, 0.70 mol) was added subsurface at about 0-10° C. The reaction mixture was stirred for an additional four hours before isopropyl trichloro tin (30.4 g, 0.11 mol) was added dropwise at about 0° C. The resulting mixture was allowed to warm to room temperature over four hours and stirred for an additional sixteen hours at room temperature. The reaction mixture was filtered through a funnel to remove the LiCl byproduct. The salt was rinsed with anhydrous hexanes (100 mL). The solvent was removed under reduced pressure in a 1 L glass flask with no shade. The relative amounts of the desired product (3) and biproducts (7) and (4) were determined by $^{119}$Sn NMR to be: Product (3): 98.0 mol %, impurity (7): 0.4 mol %, compound (5): 1.6 mol %.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of storing a sample of a monoalkyltin triamide compound having formula (3) and having a purity of at least 99 mol %:

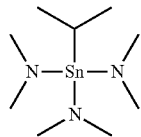
(3)

wherein a content of a compound having a formula (5) is less than 0.2 mol % with respect to the compound of formula (3):

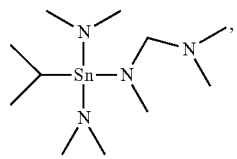
(5)

the method comprising storing the sample of the monoalkyltin triamide compound having formula (3) substantively without light exposure and at a temperature of less than 30° C.

2. The method according to claim 1, wherein the sample of monoalkyltin triamide compound having formula (3) is stored for three days to one year.

3. The method according to claim 1, wherein the sample of monoalkyltin triamide compound having formula (3) undergoes substantively no decomposition after a storage time of three days to one year.

4. The method according to claim 1, wherein the content of the compound having formula (5) in the sample of monoalkyltin triamide compound having formula (3) is less than 0.05 mol %.

5. The method according to claim 2, wherein the sample of monoalkyltin triamide compound having formula (3) undergoes substantively no decomposition after the storage time of three days to one year.

6. The method according to claim 2, wherein the content of the compound having formula (5) in the sample of monoalkyltin triamide compound having formula (3) is less than 0.05 mol %.

7. The method according to claim 1, wherein a content of a dialkyl bis(dialkylamino)tin having formula (2) is less than 1 mol %:

$$R^1{}_2Sn(NR^2{}_2)_2 \qquad (2)$$

wherein $R^1$ is isopropyl and $R^2$ is methyl.

8. The method according to claim 1, wherein a total content of tetrakis(dialkylamino)tin is less than 1 mol %.

9. The method according to claim 1, wherein a content of a tetraalkyl tin compound is less than 1 mol %.

10. The method according to claim 1, wherein an APHA color of the sample is less than 20.

* * * * *